US011934865B2

United States Patent
Ishigooka

(10) Patent No.: US 11,934,865 B2
(45) Date of Patent: Mar. 19, 2024

(54) VEHICLE CONTROL SYSTEM FOR DYNAMICALLY UPDATING SYSTEM COMPONENTS

(71) Applicant: Hitachi, Ltd., Tokyo (JP)

(72) Inventor: Tasuku Ishigooka, Tokyo (JP)

(73) Assignee: Hitachi, Ltd., Tokyo (JP)

(*) Notice: Subject to any disclaimer, the term of this patent is extended or adjusted under 35 U.S.C. 154(b) by 573 days.

(21) Appl. No.: 15/734,055

(22) PCT Filed: Jun. 13, 2018

(86) PCT No.: PCT/JP2018/022599
§ 371 (c)(1),
(2) Date: Dec. 1, 2020

(87) PCT Pub. No.: WO2019/239522
PCT Pub. Date: Dec. 19, 2019

(65) Prior Publication Data
US 2021/0216361 A1    Jul. 15, 2021

(51) Int. Cl.
G06F 9/48 (2006.01)
B60W 50/06 (2006.01)
G06F 9/38 (2018.01)

(52) U.S. Cl.
CPC ........... *G06F 9/4881* (2013.01); *B60W 50/06* (2013.01); *G06F 9/3877* (2013.01)

(58) Field of Classification Search
CPC ..... G06F 9/4881; G06F 9/3877; B60W 50/06
See application file for complete search history.

(56) References Cited

U.S. PATENT DOCUMENTS

| 2002/0099487 A1 | 7/2002 | Suganuma et al. |
| 2013/0024054 A1 | 1/2013 | Katsuta et al. |
| 2019/0018416 A1* | 1/2019 | Gassend ............... G01S 17/931 |

FOREIGN PATENT DOCUMENTS

| JP | 4399987 B2 | 1/2010 |
| JP | 2010-190673 A | 9/2010 |
| JP | 2013-23098 A | 2/2013 |
| JP | 2018-19377 A | 2/2018 |

OTHER PUBLICATIONS

International Search Report (PCT/ISA/210) issued in PCT Application No. PCT/JP2018/022599 dated Aug. 21, 2018 with English translation (two (2) pages).
Japanese-language Written Opinion (PCT/ISA/237) issued in PCT Application No. PCT/JP2018/022599 dated Aug. 21, 2018 (four (4) pages).

(Continued)

Primary Examiner — Wissam Rashid
(74) Attorney, Agent, or Firm — Crowell & Moring LLP

(57) ABSTRACT

The present disclosure improves usability and stability of a control system while suppressing resource consumption. A control controller according to the present disclosure divides, using partitioning, function groups for which control is ongoing and function groups to be updated, and updates, in accordance with conditions, only the function groups to be updated, thereby updating the required control functions while continuing appropriate control processes.

18 Claims, 22 Drawing Sheets

(56) References Cited

OTHER PUBLICATIONS

Sakurai T., "Current Status of Automotive Embedded Software: AUTOSAR and ISO 26262", Reliability Engineering Association of Japan (REAJ) Journal, 2014, vol. 36, No. 4, with English translation (21 pages).
"Avionics Application Software Standard Interface Part 1 Required Services", Arinc Specification 653P1-5, Dec. 23, 2019, (299 pages).
Extended European Search Report issued in European Application No. 18922266.4 dated Nov. 29, 2021 (15 pages).
Mauro et al., "Context-Aware Reconfiguration in Evolving Software Product Lines", Science of Computer Programming, 2018, pp. 139-159, vol. 163, XP55863668AI, (21 pages).
Pelc et al., "Practical Implementation of a Middleware and Software Component Architecture Supporting Reconfigurability of Real-Time Embedded Systems", International Conference on Computational Science and Engineering, 2009, pp. 394-401, XP31544529AI, (eight (8) pages).
Grigoleit, "Context Modeling for Dynamic Configuration of Automotive Functions", Master's Thesis in Automotive Software Engineering, 16th International IEEE Conference on Intelligent Transportation Systems, 2013, pp. 1-76, XP55863310A1, (88 pages).
Ruiz et al., "A Safe Generic Adaptation Mechanism for Smart Cars", IEEE 26th International Symposium, On Software Reliability Engineering, 2015, pp. 161-171, XP32850009A1, (11 pages).
Anthony et al., "Autonomic Middleware for Automotive Embedded Systems", Autonomic Communication, 2009, pp. 169-210, XP55863537AI, (42 pages).
Anthony et al., "A Dynamically Reconfigurable Automotive Control System Architecture", Proceedings of the 17th World Congress, The International Federation of Automatic Control, 2008, pp. 9308-9313, XP558635201AI, (six (6) pages).

* cited by examiner

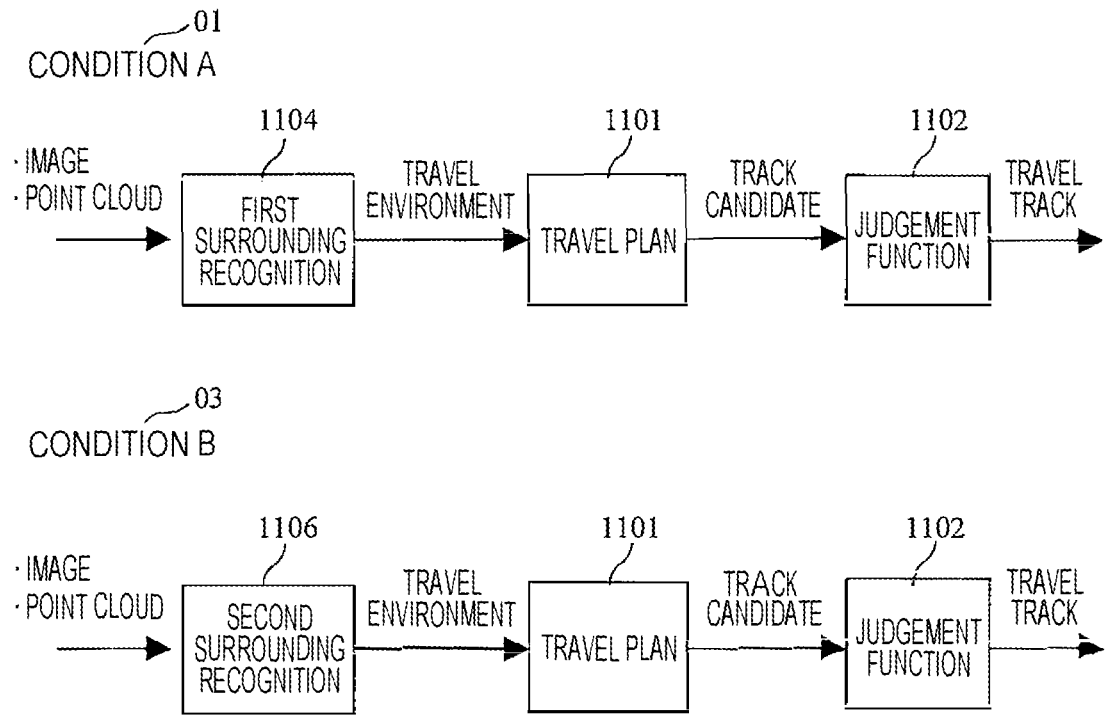

FIG. 6

CONDITION A to B  ~02

1112

| TASK NAME | TASK ID | EXECUTION CYCLE | TASK PRIORITY | EXECUTION TIME | | FUNCTION GROUP | SCHEDULING |
|---|---|---|---|---|---|---|---|
| | | | | NORMAL | INITIALIZATION | | |
| SECOND SURROUNDING RECOGNITION TASK | 4 | 50 | - | 7 | 15 | FUNCTION GROUP FOR CONDITION B | EDF |

Columns: 11121, 11122, 11123, 11124, 11125, 11126, 11127, 11128

1113

| TASK NAME | TASK ID | EXECUTION MANAGEMENT | FUNCTION GROUP | SCHEDULING |
|---|---|---|---|---|
| FIRST SURROUNDING RECOGNITION TASK | 3 | OFF | FUNCTION GROUP FOR CONDITION A | EDF |
| SECOND SURROUNDING RECOGNITION TASK | 4 | ON | FUNCTION GROUP FOR CONDITION B | EDF |

Columns: 11131, 11132, 11133, 11134, 11135

FIG. 7

CONDITION B  ~03

1114

| TASK NAME | TASK ID | EXECUTION CYCLE | TASK PRIORITY | EXECUTION TIME | | FUNCTION GROUP | SCHEDULING |
|---|---|---|---|---|---|---|---|
| | | | | NORMAL | INITIALIZATION | | |
| TRAVEL PLAN TASK | 1 | 50 | 1 | 10 | 20 | COMMON FUNCTION GROUP | FIFO |
| JUDGMENT FUNCTION TASK | 2 | 50 | 2 | 15 | 30 | COMMON FUNCTION GROUP | FIFO |
| SECOND SURROUNDING RECOGNITION TASK | 4 | 50 | - | 7 | 15 | FUNCTION GROUP FOR CONDITION B | EDF |
| MODE CHANGE TASK | 5 | 50 | - | 5 | 1 | SYSTEM GROUP | FIFO |

Columns: 11141, 11142, 11143, 11144, 11145, 11146, 11147, 11148

FIG. 8

CONDITION A — 01

1115

| SLOT ID (11151) | START TIME (11152) | END TIME (11153) | EXECUTION TARGET (11154) |
|---|---|---|---|
| 1 | 0 | 25 | COMMON FUNCTION GROUP |
| 2 | 25 | 32 | FUNCTION GROUP FOR CONDITION A |
| 4 | 43 | 50 | SYSTEM GROUP |

CONDITION A to B — 02

1116

| SLOT ID (11161) | START TIME (11162) | END TIME (11163) | EXECUTION TARGET (11164) |
|---|---|---|---|
| 1 | 0 | 25 | COMMON FUNCTION GROUP |
| 2 | 25 | 32 | FUNCTION GROUP FOR CONDITION A |
| 3 | 35 | 43 | FUNCTION GROUP FOR CONDITION B |
| 4 | 43 | 50 | SYSTEM GROUP |

CONDITION B — 03

1117

| SLOT ID (11171) | START TIME (11172) | END TIME (11173) | EXECUTION TARGET (11174) |
|---|---|---|---|
| 1 | 0 | 25 | COMMON FUNCTION GROUP |
| 2 | 35 | 43 | FUNCTION GROUP FOR CONDITION B |
| 3 | 43 | 50 | SYSTEM GROUP |

FIG. 9
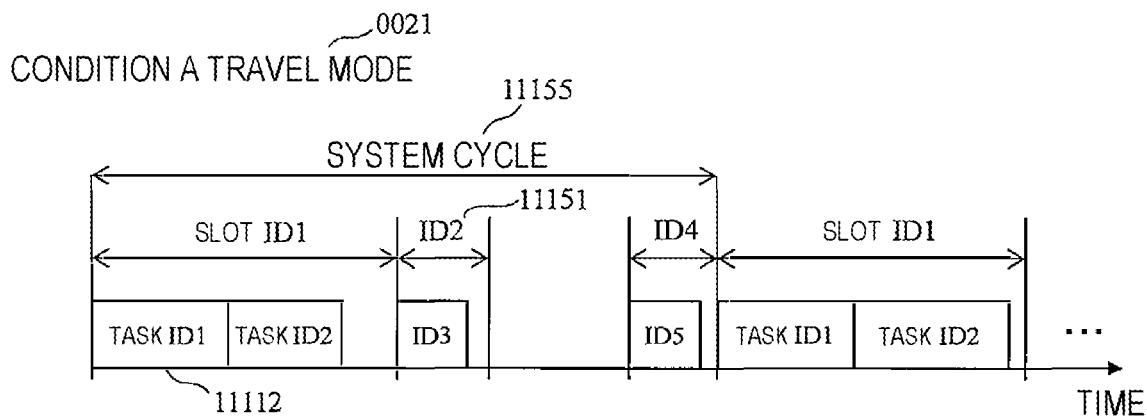
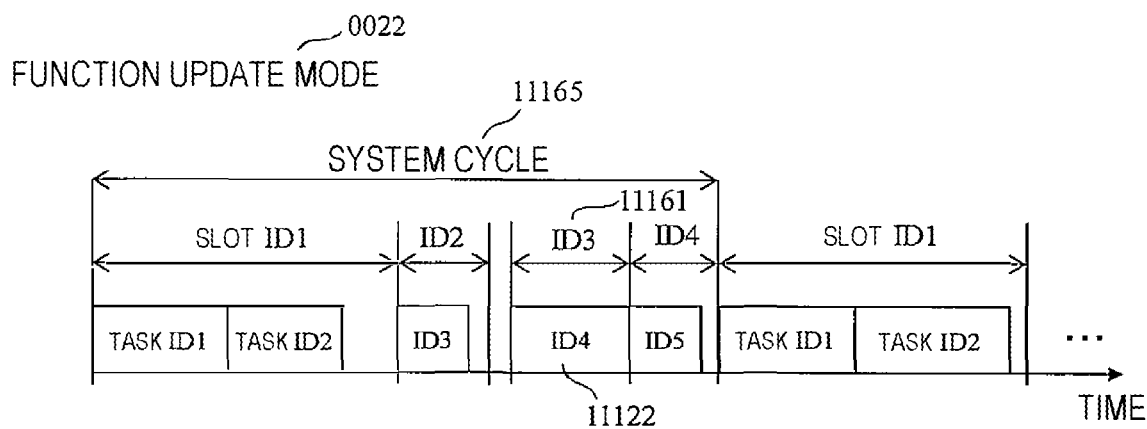
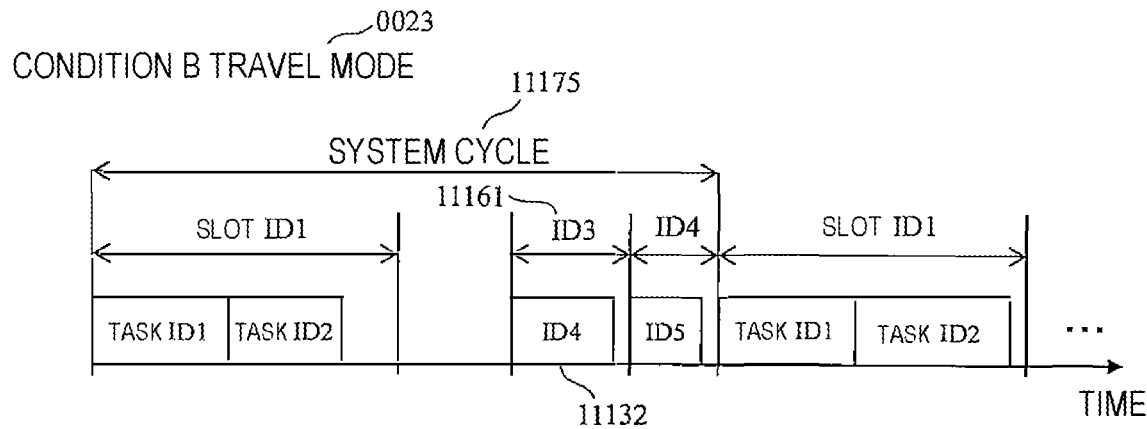

FIG. 10

CONDITION A — 01

| FUNCTION GROUP | ACCESSIBLE AREA | INACCESSIBLE AREA |
|---|---|---|
| COMMON FUNCTION GROUP | AREA A, AREA B | OTHERS |
| FUNCTION GROUP FOR CONDITION A | AREA B, AREA C | OTHERS |
| SYSTEM GROUP | ALL | NONE |

CONDITION A to B — 02

| FUNCTION GROUP | ACCESSIBLE AREA | INACCESSIBLE AREA |
|---|---|---|
| COMMON FUNCTION GROUP | AREA A, AREA B | OTHERS |
| FUNCTION GROUP FOR CONDITION A | AREA B, AREA C | OTHERS |
| FUNCTION GROUP FOR CONDITION B | AREA B, AREA D | OTHERS |
| SYSTEM GROUP | ALL | NONE |

CONDITION B — 03

| FUNCTION GROUP | ACCESSIBLE AREA | INACCESSIBLE AREA |
|---|---|---|
| COMMON FUNCTION GROUP | AREA A, AREA B | OTHERS |
| FUNCTION GROUP FOR CONDITION B | AREA B, AREA D | OTHERS |
| SYSTEM GROUP | ALL | NONE |

FIG. 25

CONDITION A to B  /02

| TASK NAME | TASK ID | EXECUTION CYCLE | TASK PRIORITY | EXECUTION TIME NORMAL | EXECUTION TIME INITIALIZATION | FUNCTION GROUP | SCHEDULING |
|---|---|---|---|---|---|---|---|
| SECOND SURROUNDING RECOGNITION TASK | 4 | 50 | - | 7 | 1 | FUNCTION GROUP FOR CONDITION B | EDF (Earliest Deadline First) |

CONDITION B  /03

| TASK NAME | TASK ID | EXECUTION CYCLE | TASK PRIORITY | EXECUTION TIME NORMAL | EXECUTION TIME INITIALIZATION | FUNCTION GROUP | SCHEDULING |
|---|---|---|---|---|---|---|---|
| TRAVEL PLAN TASK | 1 | 50 | 1 | 10 | 20 | COMMON FUNCTION GROUP | FIFO |
| JUDGMENT FUNCTION TASK | 2 | 50 | 2 | 15 | 30 | COMMON FUNCTION GROUP | FIFO |
| SECOND SURROUNDING RECOGNITION TASK | 4 | 50 | - | 7 | 1 | FUNCTION GROUP FOR CONDITION B | EDF (Earliest Deadline First) |
| MODE CHANGE TASK | 5 | 50 | - | 5 | 1 | SYSTEM GROUP | FIFO |

FIG. 26

CONDITION A  /01

| SLOT ID | START TIME | END TIME | EXECUTION TARGET |
|---|---|---|---|
| 1 | 0 | 30 | COMMON FUNCTION GROUP |
| 2 | 30 | 38 | FUNCTION GROUP FOR CONDITION A |
| 3 | 43 | 50 | SYSTEM GROUP |

CONDITION A to B  /02

| SLOT ID | START TIME | END TIME | EXECUTION TARGET |
|---|---|---|---|
| 1 | 0 | 30 | COMMON FUNCTION GROUP |
| 2 | 30 | 38 | FUNCTION GROUP FOR CONDITION A |
| 3 | 43 | 50 | SYSTEM GROUP |

CONDITION B  /03

| SLOT ID | START TIME | END TIME | EXECUTION TARGET |
|---|---|---|---|
| 1 | 0 | 30 | COMMON FUNCTION GROUP |
| 2 | 30 | 43 | FUNCTION GROUP FOR CONDITION B |
| 3 | 43 | 50 | SYSTEM GROUP |

VEHICLE CONTROL SYSTEM FOR DYNAMICALLY UPDATING SYSTEM COMPONENTS

TECHNICAL FIELD

The present disclosure relates to a control controller and a vehicle control system.

BACKGROUND ART

Embedded control systems are required to operate safely in various conditions. For example, when an algorithm operating optimally in a condition A and an algorithm operating optimally in a condition B are different, both programs need to be installed. However, a higher performance CPU and memory are required to install both programs, and hence there is a problem that the hardware cost of the system becomes high. For example, in order to accurately identify the signs of a country A and a country B by a sign recognition program of a self-driving system, it is necessary to prepare two programs optimized for each country. The number of countries to which this applies is not limited to two but is likely to increase such as a country C and a country D, and it is practically difficult to install all programs into the system because it will increase costs.

Therefore, for example, there has been proposed a technique called Over The Air (OTA), which is to download a program necessary in a condition where the program is necessary.

In addition to the example of the above-mentioned sign recognition program, there may be a use case in which, for example, when the condition of the system is switched from a failure-free normal travel mode (condition A) to a mode in which a controller failure has occurred (condition B), a control function is reconfigured in accordance with the performance of a remaining controller and a fail operation is attempted. The controller is called an electronic control unit (ECU), and the ECUs are connected by an in-vehicle network. Control data and programs can be transferred between the ECUs via a network.

For example, PTL 1 presents a series of flow in which, when a microcomputer failure of an ECU occurs, an ECU to be functionally substituted is dynamically selected from among remaining ECUs on the basis of priority, a program to be functionally substituted is transferred to a selection target, and degeneracy control of the system is realized.

CITATION LIST

Patent Literature

PTL 1: JP 4399987 B2

Non Patent Literature

NPL 1: ISO26262
NPL 2: AVIONICS APPLICATION SOFTWARE STANDARD INTERFACE, PART 1—REQUIRED SERVICES, ARINC SPECIFICATION 653P1-3, 2010

SUMMARY OF INVENTION

Technical Problem

However, PTL 1 does not consider replacement of a program during traveling. Therefore, the technique of PTL 1 has a problem that when a plurality of programs are operated on a microcomputer of one ECU, they interfere with each other and affect the control performance, and does not guarantee the operation after switching the process.

On the other hand, as a method of non-interference, the functional safety standard ISO 26262 for automobiles presented in NPL 1 discloses a method of non-interference as freedom from interference. As one implementation method, NPL 2 presents time division scheduling.

However, in the time division scheduling according to NPL 2, it is necessary to design a slot statically. Therefore, it is necessary to allocate a slot in advance also for the process after a failure. That is, the allocation before the failure remains even after the failure, and on the contrary, the allocation after the failure is set even before the failure. This indicates that slots (resources) are allocated in advance not only to the condition A and the condition B but also to all conditions, and the technique of NPL 2 has a problem that resources cannot be used effectively.

The present disclosure has been made in view of such circumstance, and provides a technique that updates a system without affecting the operation of other programs when some programs are dynamically replaced in response to a condition change.

Solution to Problem

In order to solve the above problems, a control controller according to the present disclosure is a control controller that manages and executes a plurality of functions in units of predetermined function group, and the control controller includes a partition update unit that dynamically changes a function group unit, and a mode change unit that receives a function group change implementation request for instructing change of a function group in response to a change in an operation environment of a system from an outside of the control controller, and, in response to the function group change implementation request, permits execution of the function group changed by the partition update unit.

Further features related to the present disclosure will become apparent from the description herein and the accompanying drawings. Aspects of the present disclosure are also achieved and implemented by elements, combinations of various elements, and aspects of the subsequent detailed description and the appended claims.

It should be understood that the description herein is merely exemplary and does not limit the scope of claims or applications of the present disclosure in any way.

Advantageous Effects of Invention

According to the control controller of the present disclosure, the function of the system can be changed depending on the condition without affecting the control, and hence availability and safety can be secured.

BRIEF DESCRIPTION OF DRAWINGS

FIG. 4 is a diagram illustrating an example of a data flow of a function group according to the present embodiment.

FIG. 5 is a view illustrating an example of a task configuration 1111 before update (condition A 01) of a first embodiment.

FIG. 6 is a view illustrating configuration examples of task information 1112 and execution management setting 1113 of an update function group during the update (condition A to B 02) of the first embodiment.

FIG. 7 is a view illustrating an example of a task configuration 1114 after update (condition B 03) of the first embodiment.

FIG. 8 is a view illustrating an example of a slot (time slot) design according to the first embodiment.

FIG. 9 is a diagram illustrating a scheduling example of a task according to the first embodiment.

FIG. 10 is a view illustrating an example of memory protection setting in the present embodiment.

FIG. 25 is a view illustrating an example of task information 2112 of the update function group in the condition A to B 02 and task information 2114 in the condition B 03 of a second embodiment.

FIG. 26 is a view illustrating an example of a slot design according to the second embodiment.

DESCRIPTION OF EMBODIMENTS

A control controller according to the present embodiment relates to a technique for dynamically updating a control function of a control system. For example, the control controller provides the control function of a control system in which the availability and safety of the system can be secured by replacing some of the function groups depending on the operation status while executing temporal and spatial partitioning with the function groups not interfering with each other.

Embodiments of the present disclosure are hereinafter described with reference to the accompanying drawings. In the accompanying drawings, functionally same elements are sometimes given the same numbers. It is to be noted that although the accompanying drawings present specific embodiments and implementation examples in accordance with the principle of the present disclosure, these are for the purpose of understanding of the present disclosure and are by no means used for construing the present disclosure in a limited manner.

Although the present embodiment is described in sufficient detail for a person skilled in the art to implement the technique of the present disclosure, it needs to be understood that other implementations and embodiments are possible and that the configuration and structure can be changed and various elements can be replaced without departing from the scope and spirit of the technical ideas of the present disclosure. Accordingly, the following description should not be construed in a limited manner.

Furthermore, the embodiments of the present disclosure may be, as described later, implemented by software running on a general-purpose computer, or may be implemented by dedicated hardware or a combination of software and hardware.

It is to be noted that in the following description, each piece of information of the present disclosure will be explained in the form of "table", but these pieces of information may not necessarily be expressed in a data structure of a table, and may be expressed in a data structure such as a list, DB, and queue or in another form. Therefore, in order to indicate that information is not dependent on the data structure, "table", "list.", "DB", "queue", and the like are sometimes simply referred to as "information".

When explaining the content of each piece of information, expressions such as "identification information", "identifier", "name", and "ID" can be used, and these can be replaced with one another.

In the present embodiment, the case where each ECU is set so as to make a predetermined judgement will be described. However, a control device that controls each ECU may be provided, and the control device may be set so as to make the predetermined judgement.

(1) First Embodiment

<Use Case of Vehicle System>

Figure 1:
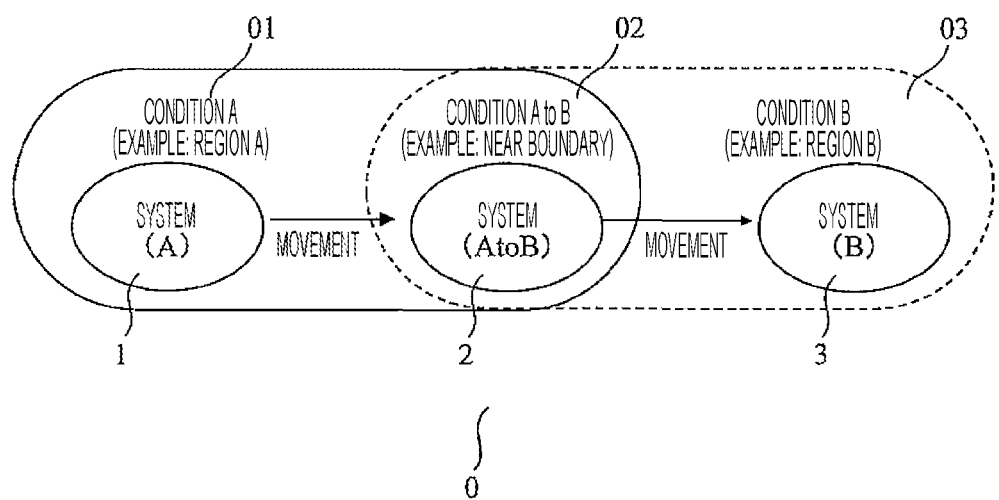
FIG. 1 is a diagram illustrating a use case (state transition in a vehicle system) of a vehicle system 10 according to the present embodiment.

FIG. 1 is a diagram illustrating a use case (state transition in a vehicle system) of a vehicle system 10 according to the present embodiment.

As illustrated in FIG. 1, in a condition A 01, the vehicle system 10 becomes a system 1 that travels with a function configuration suitable for a condition A. In the condition A (condition A to B 02) near a condition B when the vehicle moves from the condition A to the condition B, the vehicle system 10 becomes a system 2 that prepares for traveling with a function configuration suitable for the condition B. Furthermore, in a condition B 03, the vehicle system 10 becomes a system 3 that travels with a function configuration suitable for the condition B.

For example, it is possible to set the condition A to be a condition where the vehicle system 10 is in a country A (place that is not near the border with a country B), to set the condition A to B to be a condition where the vehicle system 10 is near the border between the country A and the country B, and to set the condition B to be a condition where the vehicle system 10 is in the country B (place that is not near the border with the country A). In addition, for example, it is possible to set the condition A to be a condition where each ECU is operating normally, to set the condition A to B to be a condition where a failure is likely to occur in any of the ECUs, and to set the condition B to be a condition after a failure has occurred in any of the ECUs.

<Configuration of Vehicle System>

Figure 2:
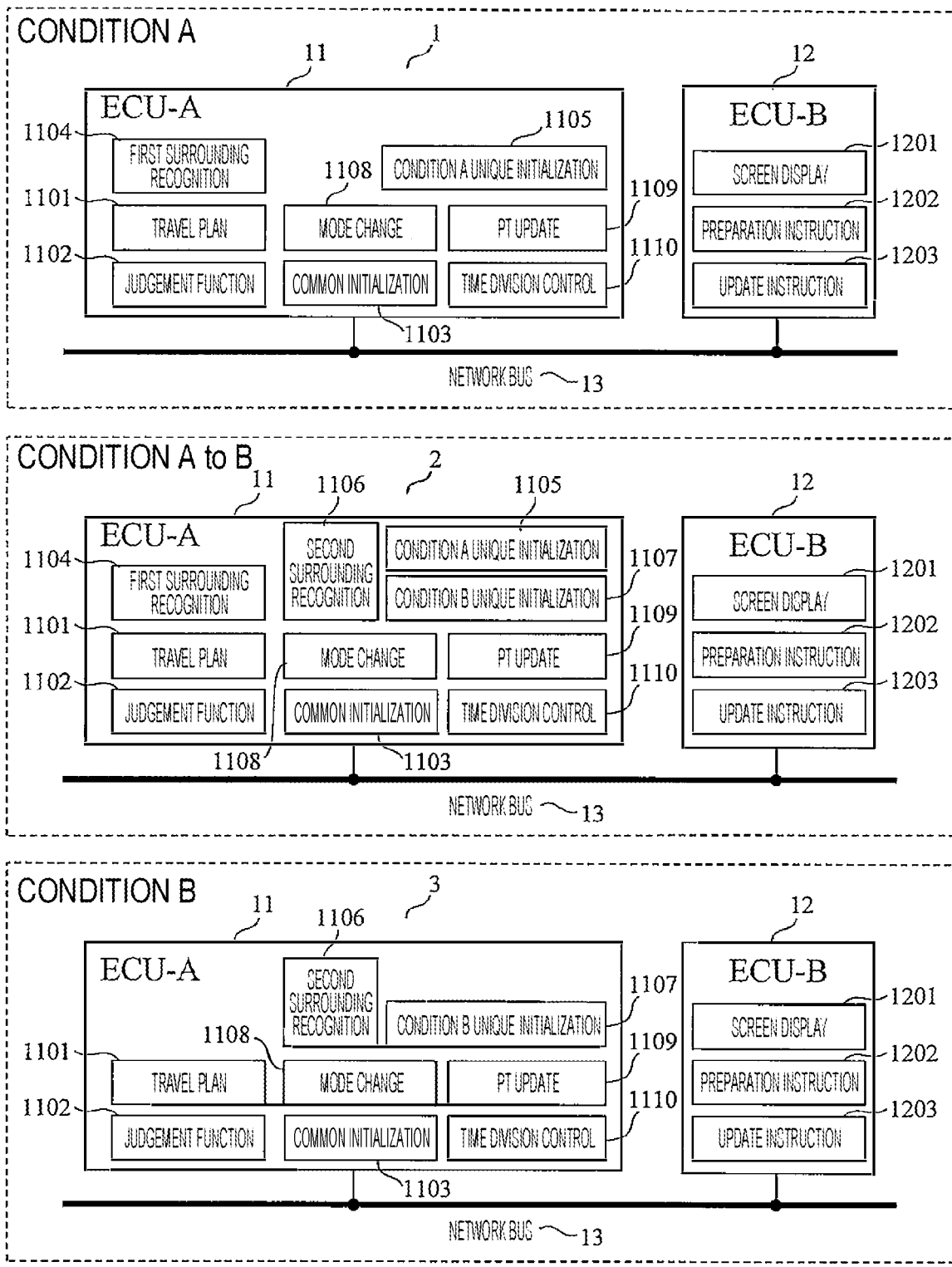
FIG. 2 is a diagram illustrating a schematic configuration example of the vehicle system 10 according to the present embodiment.

FIG. 2 is a diagram illustrating a schematic configuration example of the vehicle system 10 according to the present embodiment. The vehicle system 10 includes, for example, an ECU-A 11, an ECU-B 12, and another ECU, and is connected by a network bus 13. While in the first embodiment, each ECU is connected by the network bus 13, the present disclosure is not limited to such a configuration, and it may have a network topology in which each ECU is connected on a one-to-one basis.

The ECU-A 11 in the system 1 when the vehicle system 10 is in the condition A 01 includes, for example, a travel plan unit 1101, a judgement function unit 1102, a common initialization unit 1103, a first surrounding recognition unit 1104, a condition A unique initialization unit 1105, a mode change unit 1108, a partition update unit 1109, and a time division control unit 1110, as programs. The ECU-B 12 in the system 1 includes a screen display unit 1201, an update preparation instruction unit 1202, and an update implementation instruction unit 1203, as programs. The system 2 when the vehicle system 10 is in the condition A to B includes the configuration of the system 1 in the ECU-A 11, and a second surrounding recognition unit 1106 and a condition B unique initialization unit 1107, as programs.

The system 3 when the vehicle system 10 is in the condition B includes the configuration of the system 2 in the ECU-A 11 from which the first surrounding recognition unit 1104 and the condition A unique initialization unit 1105 as programs are deleted. It is to be noted that the deletion of the condition A unique initialization unit 1105 may be executed by the ECU-A 11 or may be executed by a control device (not illustrated) that manages and controls each ECU.

<State Transition of ECU-A>

Figure 3:
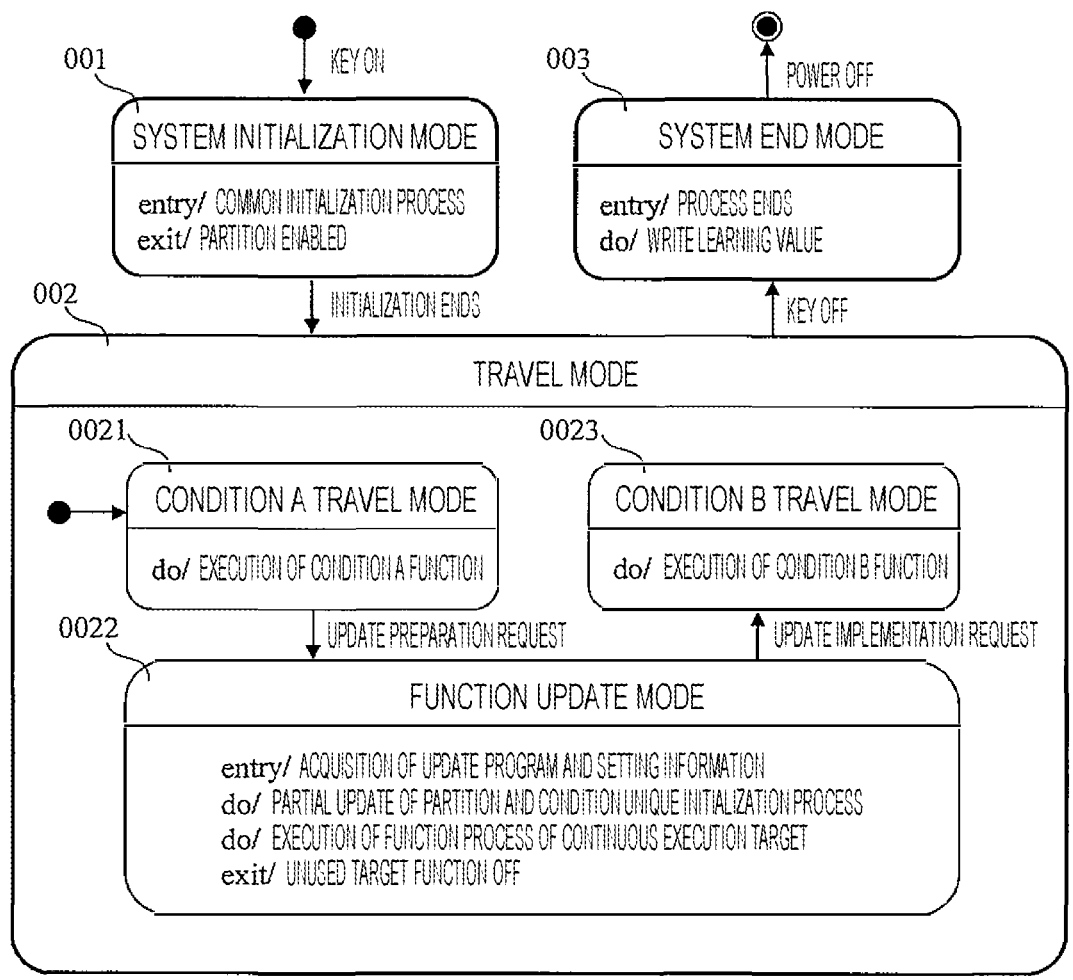
FIG. 3 is a diagram illustrating an example of a state transition of an ECU-A 11 in the present embodiment.

FIG. 3 is a diagram illustrating an example of the state transition of the ECU-A 11 in the present embodiment. By turning on the key, the ECU-A 11 enters a system initialization mode 001, and performs an overall initialization process (common initialization process). After the initialization ends, the ECU-A 11 enables partition, thereby transitioning the state to a travel mode 002. Here, "partition" in the present embodiment means dividing a memory into a plurality of areas and appropriately allocating data to be processed to each area (space separation), and scheduling various processes by time separation and executing the processes in accordance with this schedule (not affected when using the CPU) (time separation). It is to be noted that in the case of time separation, the aspect of the process is different between the case where the CPU is single-core and the case where the CPU is multi-core. In the former case, the process is executed by scheduling in time division, and in the latter case, for example, the first core executes the process of a common function group and the second core executes the process of an individual function group. In the latter case, the physical memory is common, but the memory area (address space) to be used is different.

In the travel mode 002, a condition A travel mode 0021 is initially set, and the common function group and a function group for the condition A are executed (execution of the function of the condition A). Upon receiving an update preparation request from an outside (e.g., the ECU-B 12 or a control device that controls the entirety that is not illustrated), the ECU-A 11 causes the state to transition to a function update mode 0022.

In the function update mode 0022, the ECU-A 11 acquires an update program and setting information (update information), and implements partial update and partial initialization process of the partition on the basis of the information. The ECU-A 11 continues to execute a function process of a continuous execution target, simultaneously with the partial update and the partial initialization process. For example, when an update implementation request is received from the ECU-B 12, the ECU-A 11 turns off a function not to be used and causes the state to transition to a condition B travel mode 0023. In the condition B travel mode 0023, the ECU-A 11 executes the common function group and a function group for the condition B.

It is to be noted that in the present embodiment, the update program and the setting information are assumed to have already been saved in the ECU in the vehicle system 10 and distributed via the network bus 13, but the present disclosure is not limited to this. The update program and the setting information may be saved in a server outside the vehicle system and distributed on the basis of OTA, or another method may be adopted. Furthermore, the update program and the setting information may be stored in advance in a memory (not illustrated) in the ECU-A 11 and acquired by the ECU-A 11 from the memory, or a dedicated memory area may be provided outside the ECU-A 11 and the update program and the setting information may be acquired by the ECU-A 11 from the memory area.

<Flow of Data Process of Function Group>

FIG. 4 is a diagram illustrating an example of the data flow of the function group according to the present embodiment.

In FIG. 4, in the condition A01, the first surrounding recognition unit 1104 receives a camera image and point cloud information (information of point cloud (shape) and distance) as input, and outputs travel environment information. The travel plan unit 1101 receives the travel environment information as input, and outputs track candidate information. The judgement function unit 1102 receives the track candidate information as input, and outputs travel track information.

In the condition B 03, the first surrounding recognition unit 1104 is replaced with the second surrounding recognition unit 1106. The input and output information are not changed. It is to be noted that since the condition A02 is the same as the condition A01, description thereof will be omitted.

<Task Configuration Before Update>

FIG. 5 is a view illustrating an example of a task configuration 1111 before update (condition A 01) of the first embodiment. It is to be noted that the task configuration 1111 (table) is set and managed in a memory (not illustrated) of the ECU-A 11, for example. The task configuration may be set on the memory as data from the beginning, or may be set by transmission of data from the ECU-B 12, for example.

The task configuration 1111 includes a task name 11111, a task ID 11112, an execution cycle 11113, task priority 11114, a normal execution time 11115, an initialization execution time 11116, a function group 11117, and scheduling 11118, as configuration items.

The task name 11111 is information indicating a function to be executed as a name of the task. For example, a travel plan task executes the travel plan unit 1101, a judgement function task executes the judgement function unit 1102, a first surrounding recognition task executes the first surrounding recognition unit 1104, and a mode change task executes the mode change unit 1108.

The task ID 11112 is identification information that can uniquely identify and specify the task. The execution cycle 11113 is information indicating the cycle in which the task is started. The unit is millisecond, for example. In the first embodiment, all the execution cycles are the same, but the present disclosure is not limited to this. The cycles may be different.

The task priority 11114 is information indicating the priority of the task. This priority indicates the degree to which the task is preferentially executed when tasks are in a state of being simultaneously executable, and the smaller the numeral is, the higher the priority is. This idea is based on priority scheduling.

The normal execution time 11115 is information indicating a task execution time (time allocated for task execution) after the end of initialization. The initialization execution time 11116 is information indicating an execution time of an initialization process (time allocated for the initialization process). In the first embodiment, the normal execution time 11115 and the initialization execution time 11116 are assumed to be set as a maximum execution time, but the present disclosure is not limited to this. For example, the normal execution time 11115 and the initialization execution time 11116 may be the maximum execution time to which a margin is added, or may be another aspect.

The function group 11117 is information indicating the function group to which the task belongs. For example, the common function group is an application program that is executed regardless of the condition. The function group for the condition A is a function group executed in the condition A. A system group is a function group of the basic software.

The scheduling 11118 is information indicating a scheduling policy under which the task is executed. In the first embodiment, a plurality of scheduling policies are assumed to coexist, but the present disclosure is not limited to this. For example, scheduling policies may be unified by one scheduling. In first-in-first-out (FIFO) scheduling, a task is executed on the basis of the priority of the task priority 11114 and is continuously executed until the end of the task. Earliest deadline first (EDF) is a policy in which the execution cycle 11113 of the task is regarded as a deadline (dynamic scheduling). That is, in the EDF, a process is placed in a priority queue, and when a scheduling event occurs (task end, new task generation, and the like), the queue is searched and the process with the closest execution term (deadline) is selected, and the process is scheduled as the one to be executed next. More specifically, the time obtained by subtracting the normal execution time 11115 from the time at which the next cycle starts is set as a spare time, and the less the spare time is, the higher the priority is set. For example, when a certain process has consumed an execution time, but there are a plurality of other tasks to be executed, and execution of all the tasks does not fall within 50 ms, the priority is dynamically set to be high so that the task to which EDF is given as a policy is definitely executed within 50 ms. It is to be noted that since the priority of time division control is set higher than the priority of these tasks, the operation of the time division control is guaranteed. In the first embodiment, the function group is in units of task, but the present disclosure is not limited to this. For example, the function group may be in units of function unit (program unit). In this case, one task can execute a plurality of function groups.

<Task Configuration During Update>

FIG. 6 is a view illustrating configuration examples of task information 1112 and execution management setting 1113 of an update function group during the update (condition A to B 02) of the first embodiment. It is to be noted that the task configuration 1112 and the execution management setting 1113 (table) are set and managed in the memory (not illustrated) of the ECU-A 11, for example. The task configuration may be set on the memory as data from the beginning, or may be set by transmission of data from the ECU-B 12, for example.

(i) The task information 1112 includes a task name 11121, a task ID 11122, an execution cycle 11123, task priority 11124, a normal execution time 11125, an initialization execution time 11126, a function group 11127, and scheduling 11128, as configuration items.

The task name 11121 is information indicating a function to be executed as a name of the task. For example, the second surrounding recognition task executes the second surrounding recognition unit 1106. The task ID 11122 is identification information that can uniquely identify and specify the task. The execution cycle 11123 is information indicating the cycle in which the task is started. The unit is millisecond.

The task priority 11124 is information indicating the priority of the task. The normal execution time 11125 is information indicating the execution time after the end of initialization. The initialization execution time 11126 is information indicating the execution time of the initialization process.

The function group 11127 is information indicating the function group to which the task belongs. For example, the function group for the condition B means a function group executed in the condition B. The scheduling 11118 is information indicating a scheduling policy under which the task is executed.

In the first embodiment, the function group is in units of task, but the present disclosure is not limited to this. For example, the function group may be in units of function unit (program unit). In this case, one task can execute a plurality of function groups.

(ii) The execution management setting 1113 includes a task name 11131, a task ID 11132, execution management 11133, a function group 11134, and scheduling 11135 as configuration items.

The task name 11131 is information indicating a task name. The task ID 11132 is identification information that can uniquely identify and specify the task.

The execution management 11133 is information indicating a function group that ends a process and a function group that starts a process in response to a condition change. For example, OFF means the end of a process, and ON means the start of a process. ON and OFF are managed for each function group. In the condition A to B, the second surrounding recognition task is controlled so as to be ON, and the first surrounding recognition task that has been ON in the condition A is controlled so as to be OFF.

The function group 11134 is information indicating the function group to which the task belongs. The scheduling 11135 is information indicating a scheduling policy under which the task is executed.

<Task Configuration after Update>

FIG. 7 is a view illustrating an example of a task configuration 1114 after update (condition B 03) of the first embodiment. It is to be noted that the task configuration 1114 (table) is set and managed in a memory (not illustrated) of the ECU-A 11, for example. The task configuration may be set on the memory as data from the beginning, or may be set by transmission of data from the ECU-B 12, for example.

The task configuration 1114 includes, as before update, a task name 11141, a task ID 11142, an execution cycle 11143, task priority 11144, a normal execution time 11145, an initialization execution time 11146, a function group 11147, and scheduling 11148, as configuration items.

The task name 11141 is information indicating a function to be executed as a name of the task. For example, the travel plan task executes the travel plan unit 1101, the judgement function task executes the judgement function unit 1102, the second surrounding recognition task executes the second surrounding recognition unit 1106, and the mode change task executes the mode change unit 1108.

The task ID 11142 is identification information that can uniquely identify and specify the task. The execution cycle 11143 indicates a cycle in which the task is started. The unit is millisecond. In the first embodiment, all the execution cycles are the same, but the present disclosure is not limited to this and the execution cycles may be different.

The task priority 11144 is information indicating the priority of the task. This priority is the degree to which the task is preferentially executed when tasks are in a state of being simultaneously executable, and the smaller the numeral is, the higher the priority is. This idea is based on priority scheduling.

The normal execution time 11145 is information indicating the execution time after the end of initialization. The initialization execution time 11146 is information indicating the execution time of the initialization process. In the first embodiment, the normal execution time and the initialization execution time are assumed to be set as a maximum execution time, but the present disclosure is not limited to this. For example, the normal execution time and the initialization execution time may be the maximum execution time to which a margin is added, or may be another aspect.

The function group 11147 is information indicating the function group to which the task belongs. For example, the common function group is an application program that is executed regardless of the condition, and the function group for the condition B is the function group executed in the condition B. The system group is a function group of the basic software.

The scheduling 11148 is information indicating a scheduling policy under which the task is executed. In the first embodiment, a plurality of scheduling policies are assumed to coexist, but the present disclosure is not limited to this. For example, scheduling policies may be unified by one scheduling. In the first-in-first-out (FIFO) scheduling, a task is executed on the basis of the priority of the task priority 11114 and is continuously executed until the end of the task. Earliest deadline first (EDF) is a policy in which the execution cycle 11143 of the task is regarded as a deadline. It is a method in which the time obtained by subtracting the normal execution time 11145 from the time at which the next cycle starts is set as a spare time, and the less the spare time is, the higher the priority is set. It is to be noted that since the priority of time division control is set higher than the priority of these tasks, the operation of the time division control is guaranteed. In the first embodiment, the function group is in units of task, but the present disclosure is not limited to this. For example, the function group may be in units of function unit (program unit). In this case, one task can execute a plurality of function groups.

<Slot Design>

FIG. 8 is a view illustrating an example of a slot (time slot) design according to the first embodiment. FIG. 8 illustrates the slot designs for the condition A, the condition A to B, and the condition B. The slot design includes slot IDs 11151, 11161, and 11171, start times 11152, 11162, and 11172, end times 11153, 11163, and 11173, and execution targets 11154, 11164, and 11174, as configuration items.

(i) Slot Design 1115 in Condition A 01

The slot ID 11151 is identification information that can uniquely identify and specify the slot. The start time 11152 is information indicating the start time of the time determined as a slot. The end time 11153 is information indicating the end time of the time determined as a slot. The execution target 11154 is information indicating a function group permitted to be executed in the corresponding slot.

(ii) Slot Design 1116 in Condition A to B 02

The slot ID 11161 is identification information that can uniquely identify and specify the slot. The start time 11162 is information indicating the start time of the time determined as a slot. The end time 11163 is information indicating the end time of the time determined as a slot. The execution target 11164 is information indicating a function group permitted to be executed in the corresponding slot.

(iii) Slot Design 1117 in Condition B 03

The slot ID 11171 is identification information that can uniquely identify and specify the slot. The start time 11172 is information indicating the start time of the time determined as a slot. The end time 11173 is information indicating the end time of the time determined as a slot. The execution target 11174 is information indicating a function group permitted to be executed in the corresponding slot.

In the first embodiment, as an example, a system cycle of the time division control is set to 50 ms. The system cycle is a cycle repeatedly executed on the basis of the slot design described above. For example, the slot whose slot ID 11151 is "1" is executed every 50 ms such as at 0 ms, at 50 ms, at 100 ms, . . . , because its start time 11152 is 0.

In the condition A 01, a spare time (waiting time) is provided between slots 2 and 4. A slot 3 is allocated to the spare time in the information A to B 02. Similarly, in the condition B 03, a spare time (waiting time) is provided between the slots 1 and 2.

<Task Scheduling>

FIG. 9 is a diagram illustrating a scheduling example of a task according to the first embodiment. The scheduling example is made on the basis of the slot design of FIG. 8. FIG. 8 illustrates task scheduling by time division (time separation) partitioning.

In the condition A travel mode 0021, the task of task IDs 1 and 2 (task of common function group) is executed in a slot ID 1, the task of a task ID 3 (task of function group for condition A) is executed in a slot ID 2, and the task of a task ID 5 (task of system group) is executed in a slot ID 4. The system cycle 11155 is 50 ms.

In the function update mode 0022, the task of the task IDs 1 and 2 (task of common function group) is executed in the slot ID 1, the task of the task ID 3 (task of function group for condition A) is executed in the slot ID 2, the task of a task ID 4 (task of function group for condition B) is executed in a slot ID 3, and the task ID 5 (task of system group) is executed in the slot ID 4. The system cycle 11165 is 50 ms. The system cycle 11165 is 50 ms. In the slot ID 3, deadline determination is disabled (deadline monitoring is OFF), and hence the task of the task ID 4 executes the initialization process. If not ending within the slot time, the initialization process is interrupted at the end of the slot, but restarted at the next slot start time.

In the condition B travel mode 0023, the task of the task IDs 1 and 2 (task of common function group) is executed in the slot ID 1, the task of the task ID 4 (task of function group for condition B) is executed in the slot ID 3, and the task of task ID 5 (task of system group) is executed in the slot ID 4. The system cycle 11175 is 50 ms as described above.

<Memory Protection Setting>

FIG. 10 is a view illustrating an example of memory protection setting in the present embodiment. The memory protection setting is realized in a tabular format (but not limited to the tabular format), and has function groups 411, 421, and 431 indicating the names (may be the types) of target function groups, accessible areas 412, 422, and 432 indicating the memory areas accessible by corresponding function groups, and inaccessible areas 413, 423, and 433 indicating the memory areas inaccessible by corresponding function groups, as configuration items.

In the condition A 01, the condition A to B 02, and the condition B 03, the accessible areas 412, 422, and 432 indicate areas where writing, reading, and function execution are permitted. The inaccessible areas 413, 423, and 433 indicate areas where data writing, data reading, and function execution are not permitted.

It is to be noted that in the present embodiment, the two (two types) of the accessible areas 412, 422, and 432 and the inaccessible areas 413, 423, and 433 manage memory access, but the present disclosure is not limited to this. For example, as a limited accessible area, an area where only data reading is permitted may be set, and the present disclosure is not limited also to this. For example, it may be configured that in each condition, a memory address space (area) allocated to the individual function group (e.g., the function group for the condition A and the function group for the condition B) is permitted to execute, write, and read each task of the individual function group, but the task of the common function group may be permitted only to read.

<Memory Map>

Figure 11:
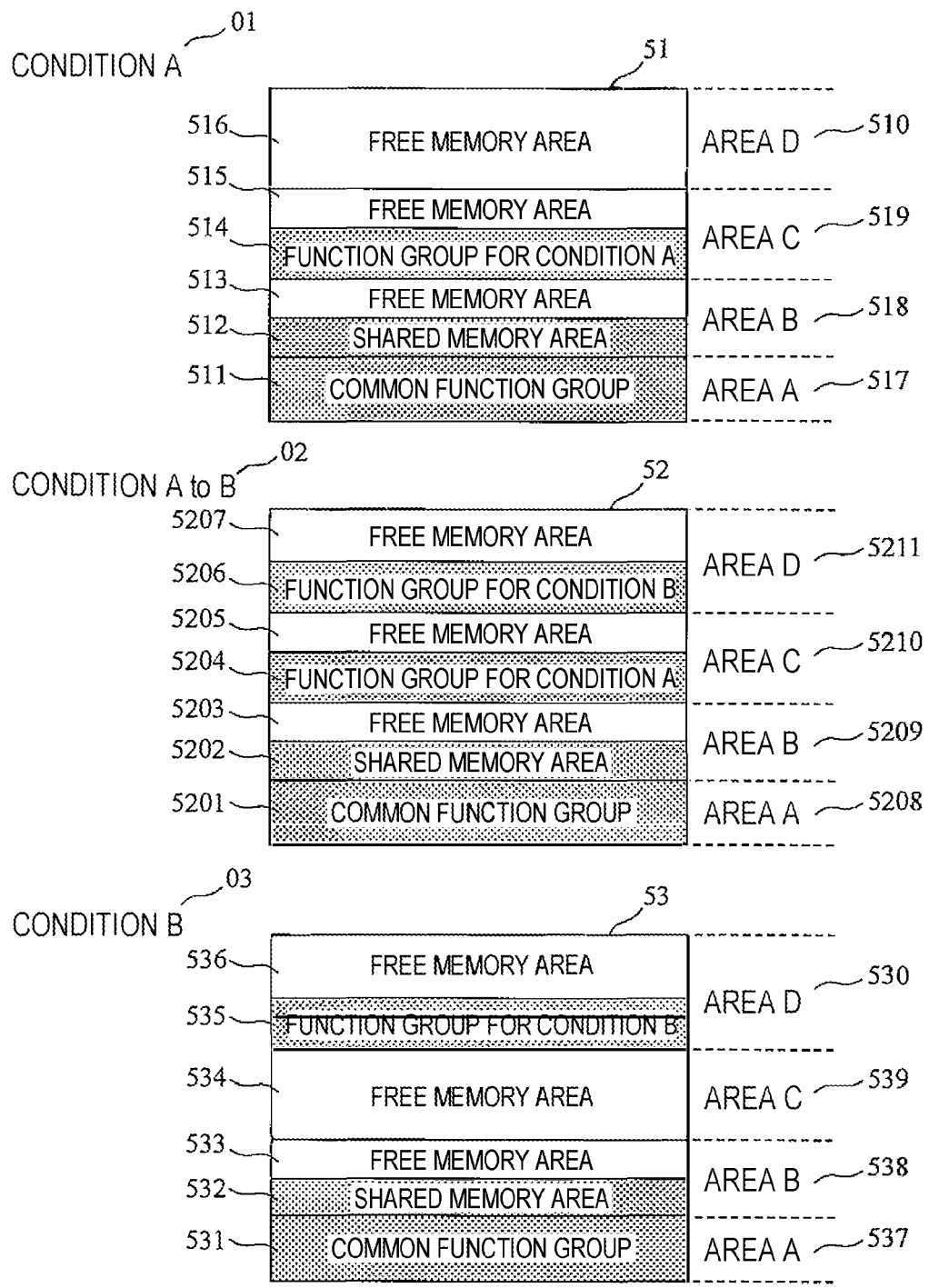
FIG. 11 is a view illustrating an example of a memory map in the present embodiment.

FIG. 11 is a view illustrating an example of a memory map in the present embodiment. In the example of FIG. 11, the memory used by the ECU-A 11 is divided into four areas (areas A to D) (space separation). However, in the memory map according to the present embodiment, unlike NPL 1, the function group that can access each area is not fixed. For example, the memory area used by the ECU-A 11 for each function group can be allocated in accordance with a command from outside (see a second embodiment, for example).

In a memory map 51 of the condition A 01, a common function group 511 is mapped to an area A 517, a shared memory area 512 and a free memory area 513 are mapped to an area B 518, a function group 514 for the condition A and a free memory area 515 are mapped to an area C 519, and a free memory area 516 is mapped to an area D 510.

In a memory map 52 of the condition A to B 02, a common function group 5201 is mapped to an area A 5208, a shared memory area 5202 and a free memory area 5203 are mapped to an area B 5209, a function group 5204 for the condition A and a free memory area 5205 are mapped to an area C 5210, and a function group 5206 for the condition B and a free memory area 5207 are mapped to an area D 5211.

In a memory map 53 of the condition B 03, a common function group 531 is mapped to an area A 537, a shared memory area 532 and a free memory area 533 are mapped to an area B 538, a free memory area 534 is mapped to an area C 539, and a function group 535 for the condition B and a free memory area 536 are mapped to an area D 530.

<Travel Plan Generation Process>

Figure 12:
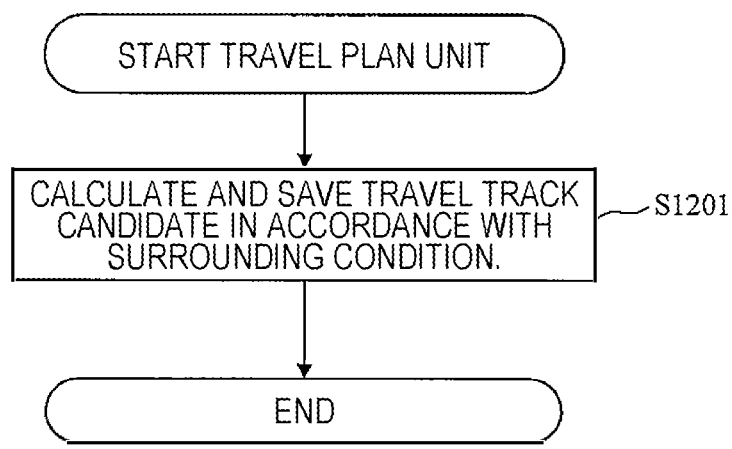
FIG. 12 is a flowchart for explaining a travel plan generation process by a travel plan unit 1101.

FIG. 12 is a flowchart for explaining a travel plan generation process by the travel plan unit 1101. Here, the travel plan unit 1101 is the subject of action, but since the travel plan unit 1101 is implemented by the program, the ECU-A11 may be the subject of action.

In step 1201, the travel plan unit 1101 calculates and saves a travel track candidate in accordance with the surrounding condition. The surrounding condition is calculated by the first surrounding recognition unit 1104 using, for example, an image captured by a camera and point cloud information. The information on the surrounding condition includes the presence or absence of a vehicle ahead, its distance, information on the lane of the road, and information on the surrounding features.

<Travel Track Determination Process>

Figure 13:
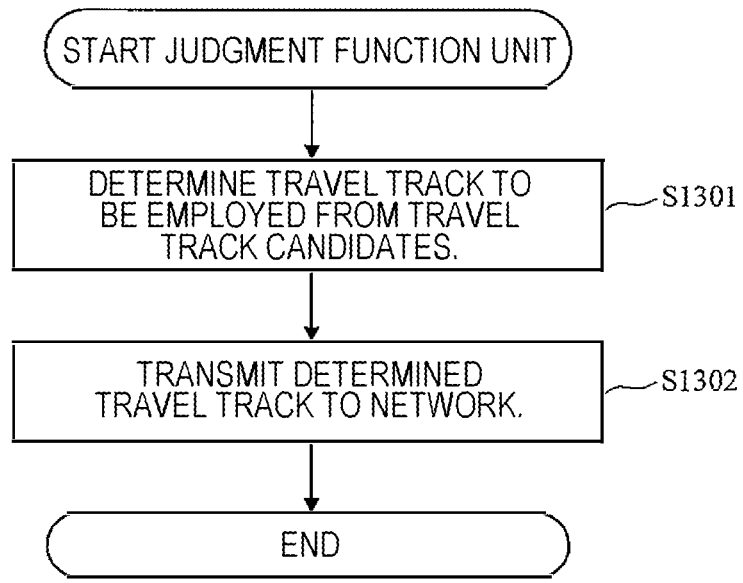
FIG. 13 is a flowchart for explaining a travel track determination process by a judgement function unit 1102.

FIG. 13 is a flowchart for explaining a travel track determination process by the judgement function unit 1102. Here, the judgement function unit 1102 is the subject of action, but since the judgement function unit 1102 is implemented by the program, the ECU-A11 may be the subject of action.

(i) Step 1301

The judgement function unit 1102 determines a travel track to be employed from the travel track candidates obtained by the travel plan generation process (FIG. 12).

(ii) Step 1302

The judgement function unit 1102 transmits the travel track determined in step 1301 to the outside of the ECU-A (e.g., the ECU-B 12 or a control device that controls each ECU) via the network bus 13.

<Common Initialization Process>

Figure 14:
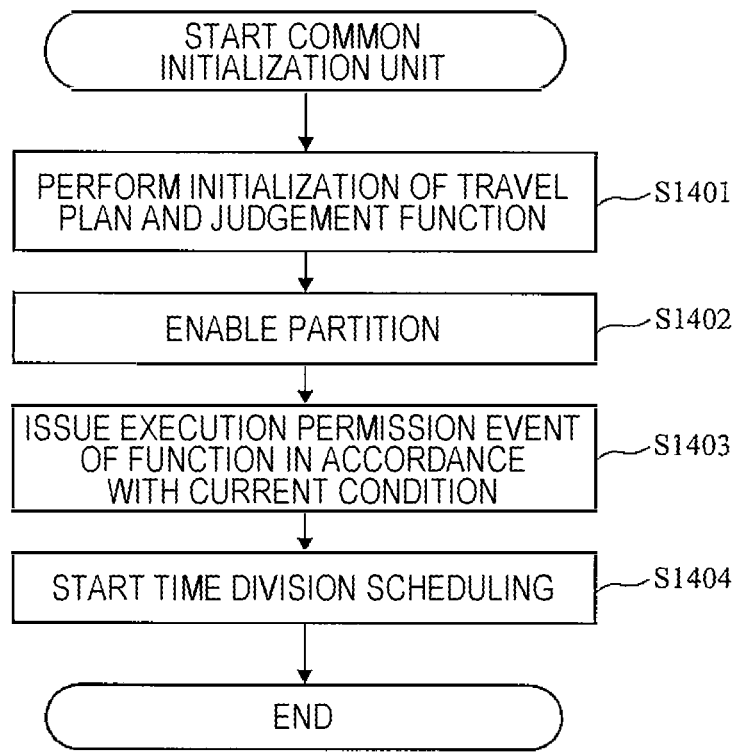
FIG. 14 is a flowchart for explaining a common initialization process by a common initialization unit 1103.

FIG. 14 is a flowchart for explaining the common initialization process by the common initialization unit 1103. Here, the common initialization unit 1103 is the subject of action, but since the common initialization unit 1103 is implemented by the program, the ECU-A11 may be the subject of action.

(i) Step 1401

The common initialization unit 1103 performs initialization of the travel plan unit 1101 and the judgement function unit 1102.

(ii) Step 1402

The common initialization unit 1103 enables the partition. That is, it enables the memory protection (spatial separation: FIG. 11) and the deadline determination of the time division scheduling (temporal separation: FIG. 9).

It is to be noted that the time division scheduling is performed when the CPU is single-core, and when the CPU is multi-core, the time separation is realized by allocating, for example, a program of the common function group and a program of the individual function group to different cores.

(iii) Step 1403

The common initialization unit 1103 issues an execution permission event of a function in accordance with the current condition.

(iv) Step 1404

The common initialization unit 1103 starts the time division scheduling. Specifically, a timer is set so as to execute the time division control unit 1110.

<First Surrounding Recognition Process>

Figure 15:
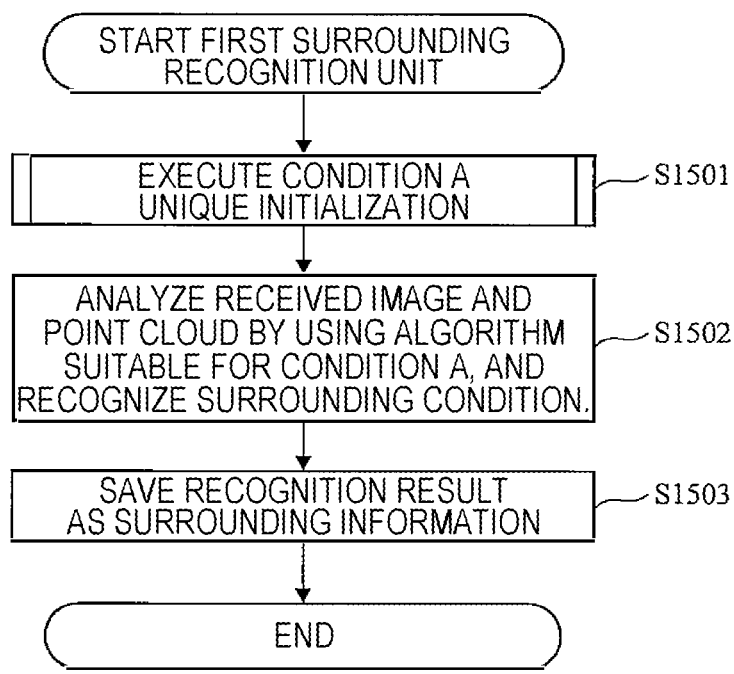
FIG. 15 is a flowchart for explaining a surrounding recognition process by a first surrounding recognition unit 1104.

FIG. 15 is a flowchart for explaining a surrounding recognition process by the first surrounding recognition unit 1104. Here, the first surrounding recognition unit 1104 is the subject of action, but since the first surrounding recognition unit 1104 is implemented by the program, the ECU-A11 may be the subject of action.

(i) Step 1501

The first surrounding recognition unit 1104 commands the condition A unique initialization unit 1105 to execute the condition A unique initialization process. It is to be noted that the details of step 1501 will be described later (see FIG. 16).

(ii) Step 1502

Upon completing the condition A unique initialization process, the first surrounding recognition unit 1104 analyzes the received image and point cloud by using an algorithm suitable for the condition A, and recognizes the surrounding condition.

(iii) Step 1503

The first surrounding recognition unit 1104 saves the recognition result as surrounding information into a memory (not illustrated).

<Condition A Unique Initialization Process>

Figure 16:
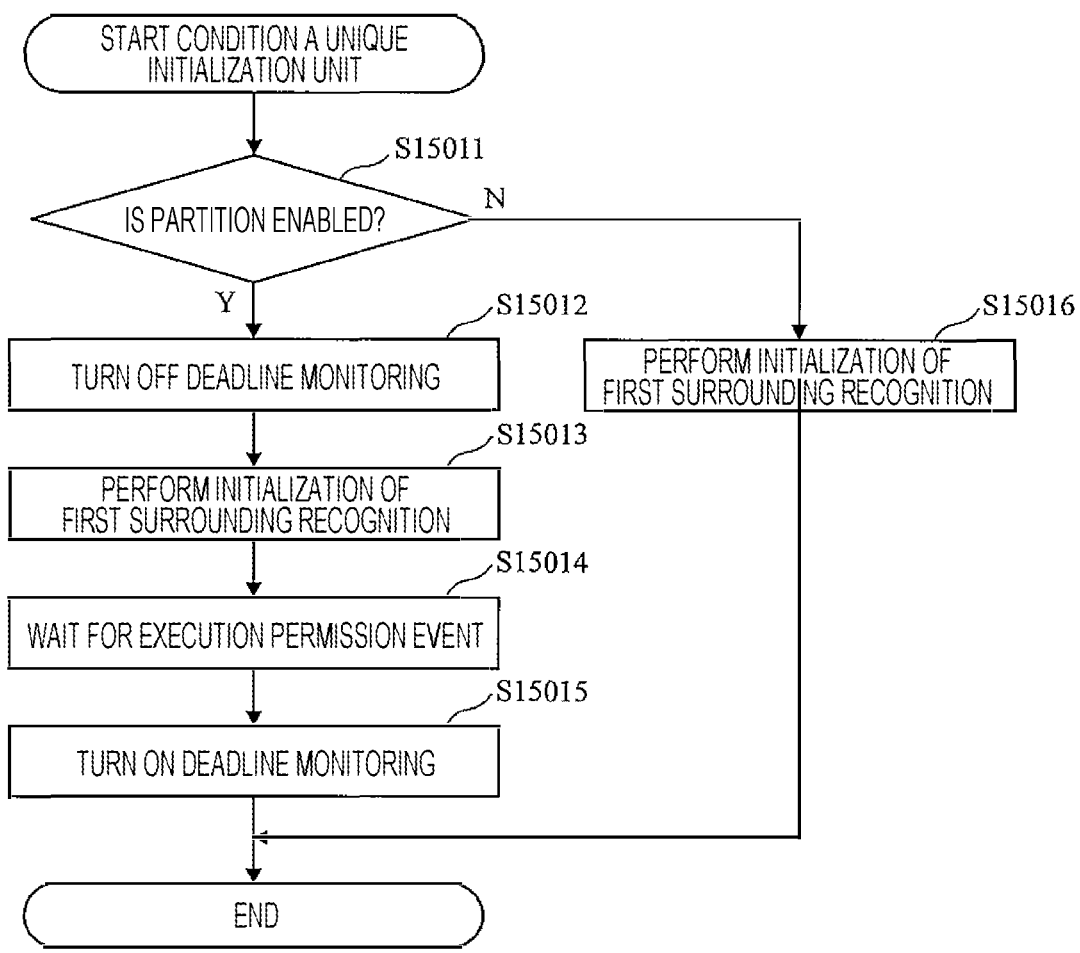
FIG. 16 is a flowchart for explaining a condition A unique initialization process by a condition A unique initialization unit 1105.

FIG. 16 is a flowchart for explaining the condition A unique initialization process by the condition A unique initialization unit 1105. Here, the condition A unique initialization unit 1105 is the subject of action, but since the condition A unique initialization unit 1105 is implemented by the program, the ECU-A11 may be the subject of action. It is to be noted that in the present embodiment, there are two types of initialization process. One is performed when the engine is started (step 15016), and the other is performed when the condition changes during traveling (from the condition A to the condition A to B).

(i) Step 15011

The condition A unique initialization unit 1105 determines whether the partition is enabled, i.e., whether space separation (memory protection) and time separation (time division scheduling) are enabled. If the partition is enabled (during time division scheduling (during traveling)) (if Yes in step 15011), the process proceeds to step 15012. If the partition is not enabled (e.g., when the engine is started: if No in step 15011), the process proceeds to step 15016.

(ii) Step 15012

The condition A unique initialization unit 1105 sets the deadline monitoring of the function group executed in the condition A to OFF. That is, a deadline task is not executed at the time of the initialization process.

(iii) Step 15013

The condition A unique initialization unit 1105 performs initialization of the first surrounding recognition unit 1104.

(iv) Step 15014

The condition A unique initialization unit 1105 waits for an execution permission event. If time division scheduling is being executed while waiting, a dispatch occurs.

(v) Step 15015

The condition A unique initialization unit 1105 turns on (enables the deadline determination) the deadline monitoring of the function group executed in the condition A.

(vi) Step 15016

The condition A unique initialization unit 1105 performs initialization of the first surrounding recognition unit 1104.

<Second Surrounding Recognition Process>

Figure 17:
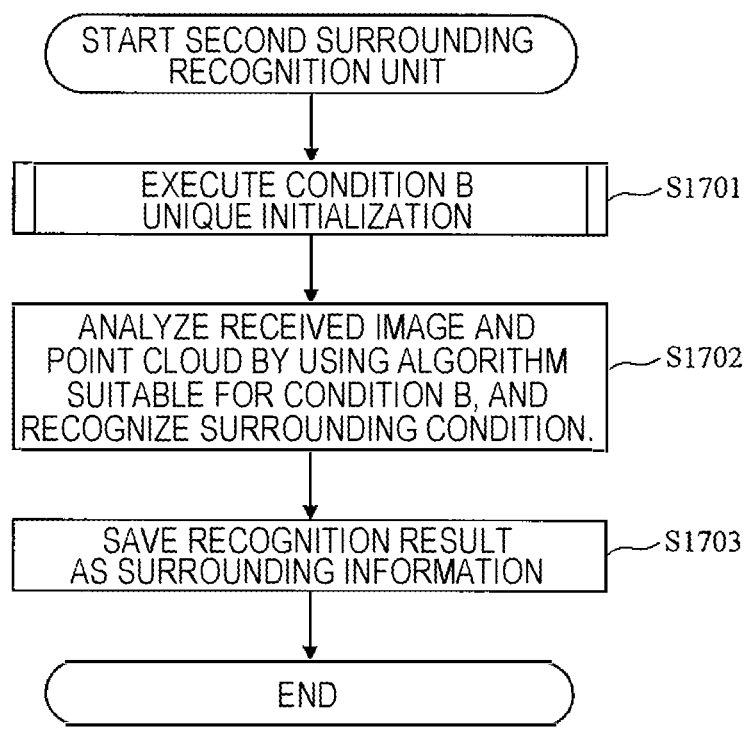
FIG. 17 is a flowchart for explaining a surrounding recognition process by a second surrounding recognition unit 1106.

FIG. 17 is a flowchart for explaining a surrounding recognition process by the second surrounding recognition unit 1106. Here, the second surrounding recognition unit 1106 is the subject of action, but since the second surrounding recognition unit 1106 is implemented by the program, the ECU-A11 may be the subject of action.

(i) Step 1701

The second surrounding recognition unit 1106 commands the condition B unique initialization unit 1107 to execute a condition B unique initialization process. It is to be noted that the details of step 1701 will be described later (see FIG. 18).

(ii) Step 1702

Upon completing the condition B unique initialization process, the second surrounding recognition unit 1106 analyzes the received image and point cloud by using an algorithm suitable for the condition B, and recognizes the surrounding condition.

(iii) Step 1703

The second surrounding recognition unit 1106 saves the recognition result as surrounding information into a memory (not illustrated).

<Condition B Unique Initialization Process>

Figure 18:
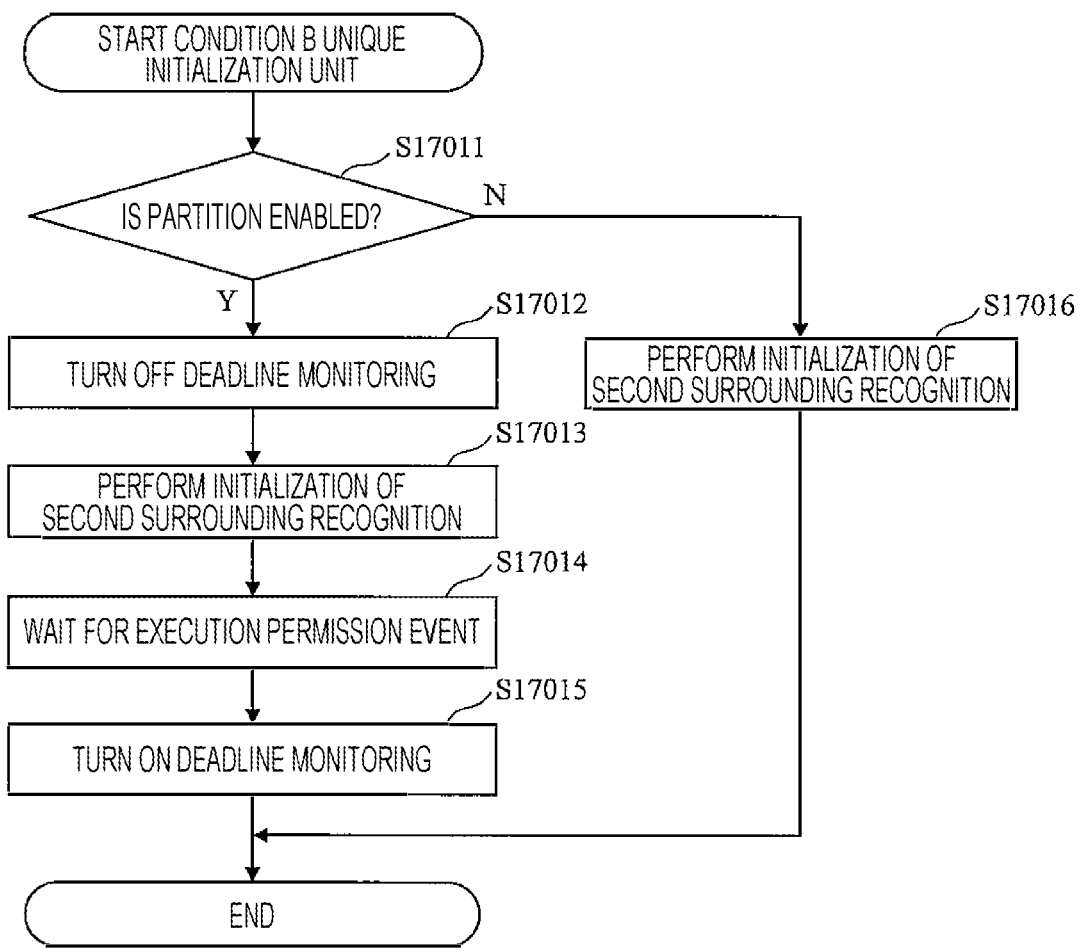
FIG. 18 is a flowchart for explaining a condition B unique initialization process by a condition B unique initialization unit 1107.

FIG. 18 is a flowchart for explaining the condition B unique initialization process by the condition B unique initialization unit 1107. Here, the condition B unique initialization unit 1107 is the subject of action, but since the condition B unique initialization unit 1107 is implemented by the program, the ECU-A11 may be the subject of action. It is to be noted that in the present embodiment, there are two types of initialization process. One is performed when the engine is started (step 17016), and the other is performed when the condition changes during traveling (from the condition B to the condition A to B).

(i) Step 17011

The condition B unique initialization unit 1107 determines whether the partition is enabled, i.e., whether space separation (memory protection) and time separation (time division scheduling) are enabled. If the partition is enabled (during time division scheduling (during traveling)) (if Yes in step 17011), the process proceeds to step 17012. If the partition is not enabled (e.g., when the engine is started: if No in step 17011), the process proceeds to step 17016.

(ii) Step 17012

The condition B unique initialization unit 1107 sets the deadline monitoring of the function group executed in the condition B to OFF. That is, the deadline task is not executed at the time of the initialization process.

(iii) Step 17013

The condition B unique initialization unit 1107 performs initialization of the second surrounding recognition unit 1106.

(iv) Step 17014

The condition B unique initialization unit 1107 waits for an execution permission event. If time division scheduling is being executed while waiting, a dispatch occurs.

(v) Step 17015

The condition B unique initialization unit 1107 turns on (enables the deadline determination) the deadline monitoring of the function group executed in the condition B.

(vi) Step 17016

The condition B unique initialization unit 1107 performs initialization of the second surrounding recognition unit 1106.

<Mode Change Process>

Figure 19:
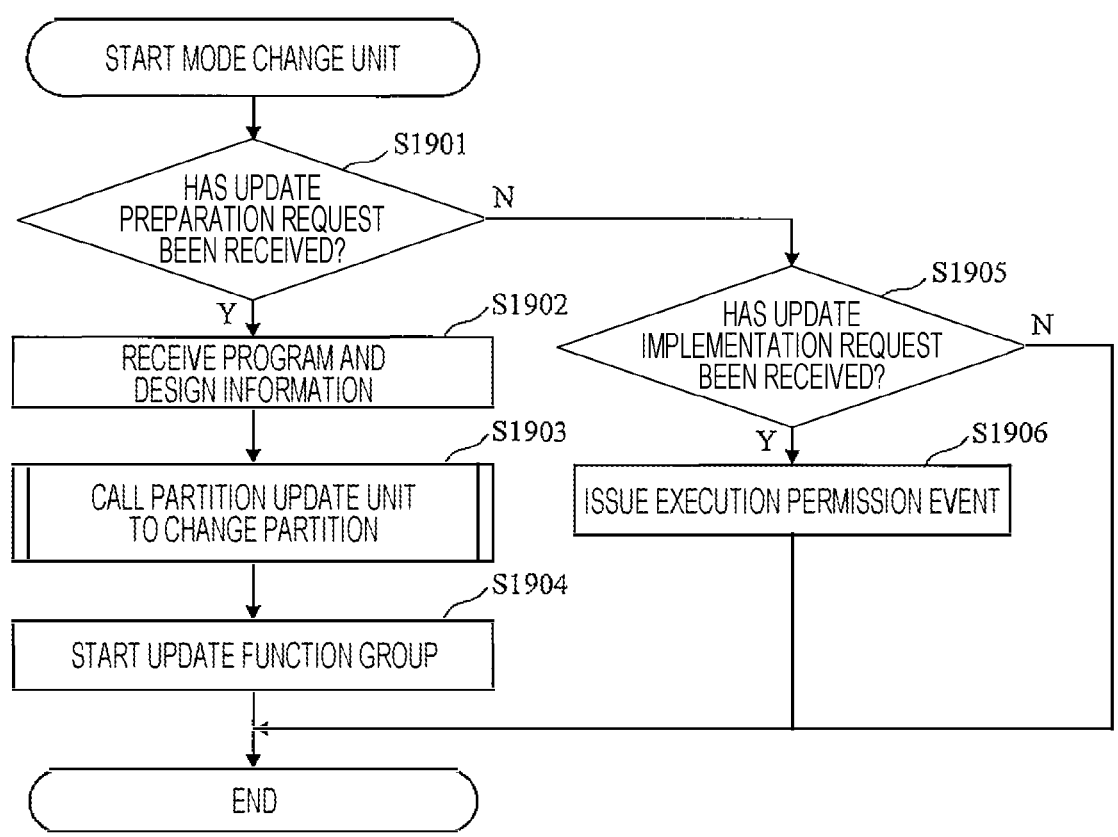
FIG. 19 is a flowchart for explaining a mode change process by a mode change unit 1108.

FIG. 19 is a flowchart for explaining a mode change process by the mode change unit 1108. Here, the mode change unit 1108 is the subject of action, but since the mode change unit 1108 is implemented by the program, the ECU-A11 may be the subject of action.

(i) Step 1901

The mode change unit 1108 determines whether an update preparation request has been received. The ECU-A11 receives an update preparation request or an update implementation request from the outside (e.g., the ECU-B 12 and a control device that controls each ECU (not illustrated) overall).

If the update preparation request has been received (if Yes in step 1901), the process proceeds to step 1902. If the update preparation request has not been received (if No in step 1901: if the update implementation request has been received or if no request has been received), the process proceeds to step 1905.

(ii) Step 1902

The mode change unit 1108 receives a program and design information from the outside. In the present embodiment, the reception target is a program, but the present disclosure is not limited to this. For example, it may be configured so that only the parameters are received and the program can follow the condition change only by changing the parameters.

(iii) Step 1903

The mode change unit 1108 calls the partition update unit 1109 to change the partition. The details of step 1903 will be described later (see FIG. 20).

(iv) Step 1904

The mode change unit 1108 starts the update function group. In the present embodiment, since an example of shifting from the condition A to the condition B is given, the function group for the condition B is started.

(v) Step 1905

The mode change unit 1108 determines whether the update implementation request has been received. If the update implementation request has been received (if Yes in step 1905), the process proceeds to step 1906. If the update implementation request has not been received (if No in step 1905: if no request has been received), the mode change process ends.

(vi) Step 1906

The mode change unit 1108 issues an execution permission event.

<Partition Update Process>

Figure 20:
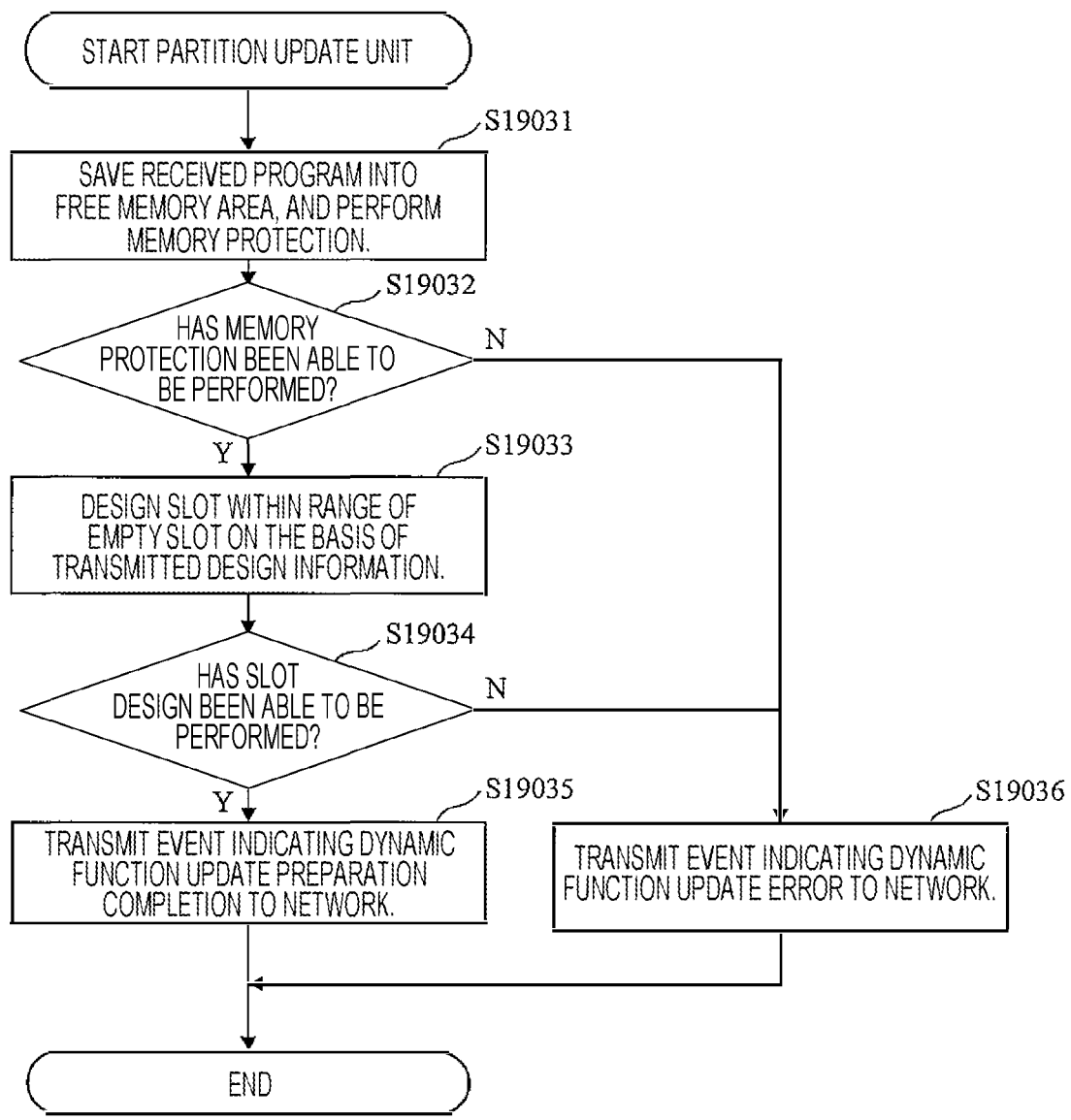
FIG. 20 is a flowchart for explaining a partition update process (detail of step 1903) by a partition update unit 1109.

FIG. 20 is a flowchart for explaining a partition update process (detail of step 1903) by the partition update unit 1109. Here, the partition update unit 1109 is the subject of action, but since the partition update unit 1109 is implemented by the program, the ECU-A11 may be the subject of action.

(i) Step 19031

The partition update unit 1109 saves the received program into a free memory area and performs memory protection. Specifically, it is the process in the condition A to B in FIG. 11.

(ii) Step 19032

The partition update unit 1109 determines whether the memory protection has been able to be performed. If the memory protection has been able to be performed (if Yes in step 19032), the process proceeds to step 19033. If the memory protection has not been able to be performed (if No in step 19032), the process proceeds to step 19036.

(iii) Step 19033

The partition update unit 1109 designs a slot within the range of an empty slot on the basis of design information (may be the design information held in the ECU-A 11) transmitted from the outside. For example, the execution time of the target task is subtracted from the time of the empty slot, and if the result is a positive number, the execution time of the task is set as the time of the slot. However, the present disclosure is not limited to this method.

(iv) Step 19034

The partition update unit 1109 determines whether the slot design has been able to be performed. If the slot design has been able to be performed (if Yes in step 19034), the process proceeds to step 19035. If the slot design has not been able to be performed (if No in step 19034), the process proceeds to step 19036.

(v) Step 19035

The partition update unit 1109 transmits an event indicating a dynamic function update preparation completion to the network bus 13. For example, the ECU-B 12 or an external server (not illustrated) receives the event and transmits an update implementation request of the condition B travel mode to the ECU-A 11.

(vi) Step 19036

The partition update unit 1109 transmits an event indicating a dynamic function update error to the network bus 13. In this case, for the purpose of calling for attention to the user, the fact that the dynamic function update has become an error may be displayed on the screen of the display unit.

<Time Division Control Process>

Figure 21:
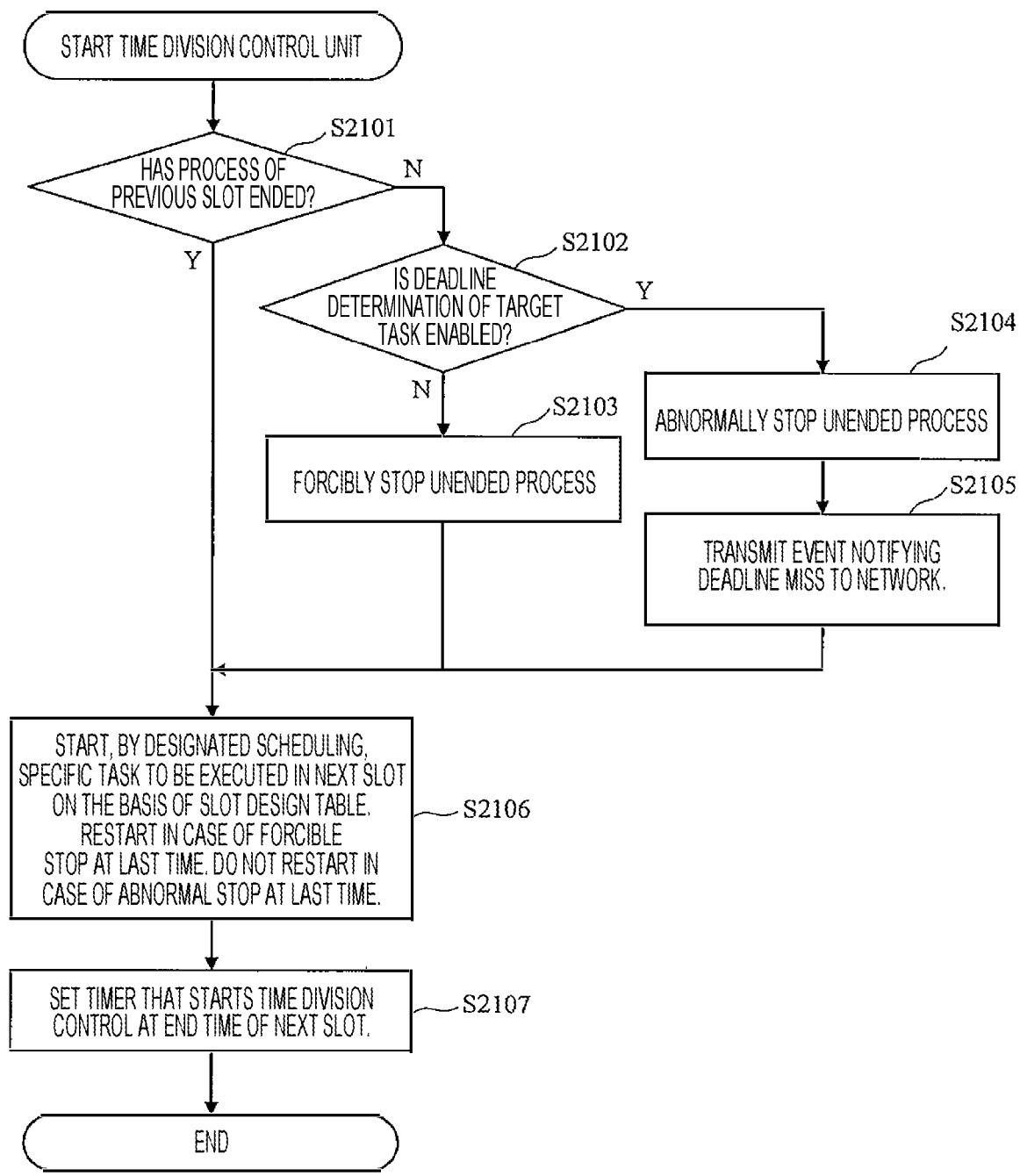
FIG. 21 is a flowchart for explaining a time division control process by a time division control unit 1110.

FIG. 21 is a flowchart for explaining a time division control process by the time division control unit 1110. Here, the time division control unit 1110 is the subject of action, but since the time division control unit 1110 is implemented by the program, the ECU-A11 may be the subject of action.

(i) Step 2101

The time division control unit 1110 judges whether the process of a slot before the current slot (slot with the slot ID one before) has ended. If the process of the slot before the current slot has ended (if Yes in step 2101: in the case of the first execution for the slot), the process proceeds to step 2106. If the process of the slot before the current slot has not ended (if No in step 2101), the process proceeds to step 2102.

(ii) Step 2102

The time division control unit 1110 determines whether the deadline determination of the target task is enabled (whether the deadline monitoring is ON). If the deadline determination is enabled (if Yes in step 2102), the process proceeds to step 2103. If the deadline determination is disabled (if No in step 2102), the process proceeds to step 2104.

(iii) Step 2103

The time division control unit 1110 forcibly stops an unended process in the previous slot. When the process has not ended despite coming to the end of the slot, the CPU (processor) used for the next process is used if the execution of the unended process is continued. Since partitioning is not performed at this stage, the unended process is forcibly ended. For example, when entering the condition A to B, the initialization process is executed at first, but as presented in FIG. 6, the initialization process often takes a long process time even in the normal process. Therefore, the initialization process may not end during the execution cycle (e.g., 50 ms). This event of being unended does not occur because the process is abnormal, and hence the unended process will be forcibly stopped.

(iv) Step 2104

The time division control unit 1110 abnormally stops the unended process in the previous slot (e.g., since the deadline has been exceeded, it is judged to be abnormal and the process is stopped).

(v) Step 2105

The time division control unit 1110 transmits an event notifying a deadline miss to the network bus 13. This allows, for example, another ECU (ECU-B 12) or a control device that executes the overall control of each ECU to recognize the task of abnormal stop.

(vi) Step 2106

The time division control unit 1110 starts, by designated scheduling, a specific task to be executed in the next slot on the basis of the slot design table. In the case of forcible stop at last time, the time division control unit 1110 restarts the forcibly ended task. However, the time division control unit 1110 does not start the task again in the case of abnormal stop at the last time.

(vii) Step 2107

The time division control unit 1110 sets a timer that starts the time division control unit 1110 at the end time of the next slot.

<Screen Display Process>

Figure 22:
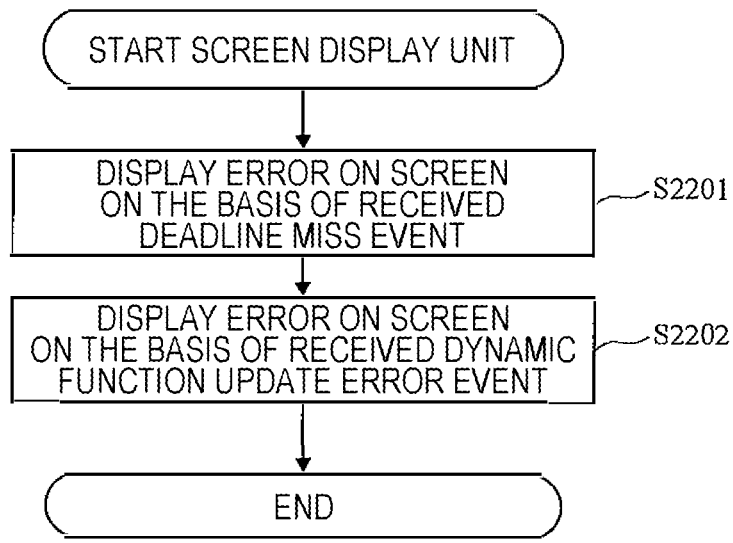
FIG. 22 is a flowchart for explaining a screen display process by a screen display unit 1201 of an ECU-B 12.

FIG. 22 is a flowchart for explaining a screen display process by the screen display unit 1201 of the ECU-B 12. Here, the screen display unit 1201 is the subject of action, but since the screen display unit 1201 is implemented by the program, the ECU-B 12 may be the subject of action.

(i) Step 2201

The screen display unit 1201 displays an error on the screen on the basis of the deadline miss event received from the time division control unit 1110 of the ECU-A 11.

(ii) Step 2202

The screen display unit 1201 displays an error on the screen on the basis of the dynamic function update error event received from the partition update unit 1109 of the ECU-A 11.

In the present embodiment, the screen display is performed at the time of an error, but the present disclosure is not limited to this. Fail-safe that safely stops the system may be performed. A server (not illustrated) may be notified of this and the task may be executed again, but the present disclosure is not limited to this.

<Update Preparation Instruction Process>

Figure 23:
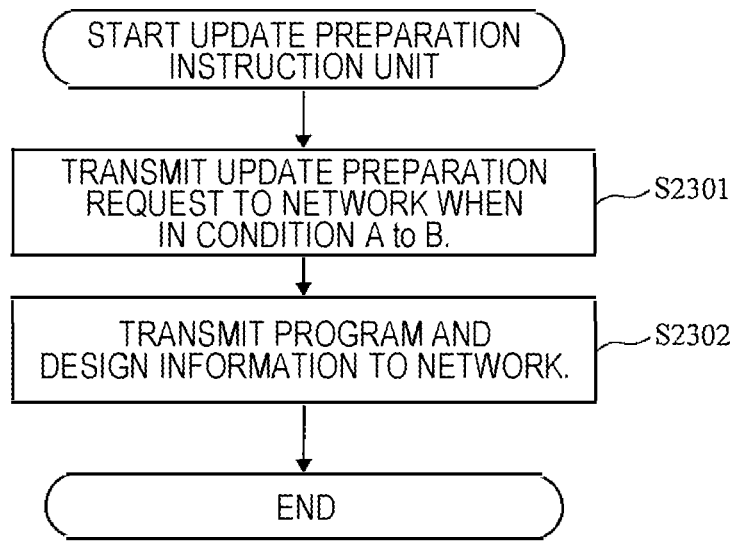
FIG. 23 is a flowchart for explaining an update preparation instruction process by an update preparation instruction unit 1202 of the ECU-B 12.

FIG. 23 is a flowchart for explaining an update preparation instruction process by the update preparation instruction unit 1202 of the ECU-B 12. Here, the update preparation instruction unit 1202 is the subject of action, but since the update preparation instruction unit 1202 is implemented by the program, the ECU-B 12 may be the subject of action.

(i) Step 2301

When the condition is in the transition state (boundary) (e.g., in the condition A to B or in a condition B to A), the update preparation instruction unit 1202 transmits an update preparation request to the network bus 13.

(ii) Step 2302

The update preparation instruction unit 1202 transmits an update program and design information to the ECU-A 11 via the network bus 13 so that the ECU-A 11 can use them.

<Update Implementation Instruction Process>

Figure 24:
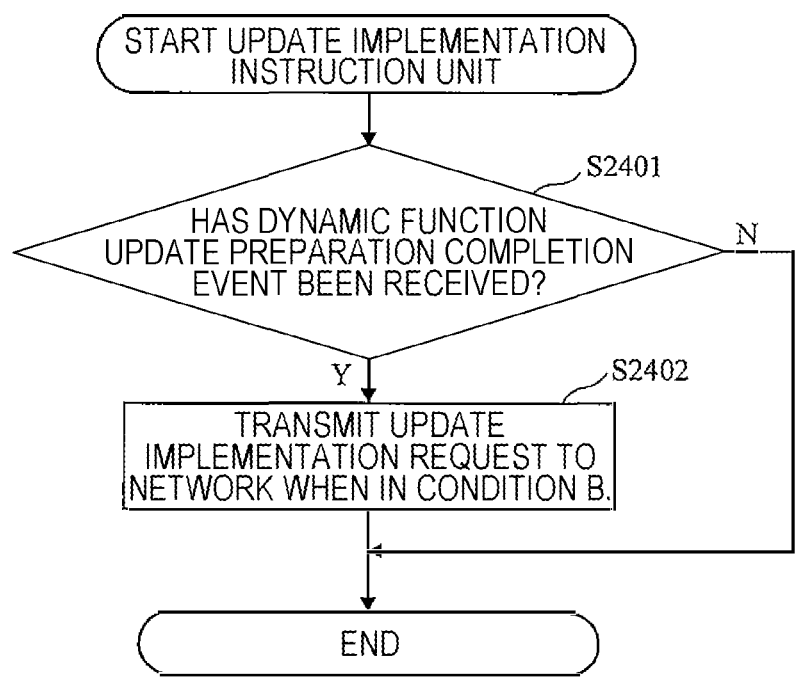
FIG. 24 is a flowchart for explaining an update implementation instruction process by an update implementation instruction unit 1203 of the ECU-B 12.

FIG. 24 is a flowchart for explaining an update implementation instruction process by the update implementation instruction unit 1203 of the ECU-B 12. Here, the update implementation instruction unit 1203 is the subject of action, but since the update implementation instruction unit 1203 is implemented by the program, the ECU-B 12 may be the subject of action.

(i) Step 2401

The update implementation instruction unit 1203 determines whether a completion event of dynamic function update preparation has been received. If the completion event of dynamic function update preparation has been received (if Yes in step 2401), the process proceeds to step 2402. If the completion event of dynamic function update preparation has not been received (if No in step 2401), the update implementation instruction process ends.

(ii) Step 2402

When the condition is switched (e.g., when the condition A to B is switched to the condition B, or when the condition B to A is switched to the condition A), the update implementation instruction unit 1203 transmits an update implementation request to the ECU-A 11 via the network bus 13.

<Summary of First Embodiment>

According to the first embodiment, since the update is made possible in units of function group, hardware resources can be saved. Since vehicle travel is made possible by selecting a suitable function group depending on the condition, safe and comfortable travel is made possible.

(2) Second Embodiment

<Task Information and Task Configuration of Update Function Group>

FIG. 25 is a view illustrating an example of task information 2112 of the update function group in the condition A to B 02 and task information 2114 in the condition B 03 of the second embodiment. The configuration items are the same as those in the first embodiment. It is to be noted that in FIG. 25, the task information of the condition A is the same as that in the first embodiment, and hence it is omitted (see FIG. 5).

(i) In the condition A to B 02, a task name 21121 of the task information 2112 indicates the name of the task of a function to be executed. For example, the second surrounding recognition task executes the second surrounding recognition unit 1106.

A task ID 21122 indicates an ID by which the task can be identified. An execution cycle 21123 indicates a cycle in which the task is started. The unit is millisecond.

Task priority 21124 indicates the priority of the task. However, if the scheduling is earliest deadline first (EDF), the task priority is not set (numerical values are not entered in the table). A normal execution time 21125 indicates the execution time of the normal task after the end of the initialization process. An initialization execution time 21126 indicates the execution time of the initialization process.

A function group 21127 indicates a function group to which the task belongs. The function group for the condition B means the function group executed in the condition B. Scheduling 21118 indicates a scheduling policy under which the task is executed.

In the second embodiment, the initialization execution time 21126 is set shorter than that in the first embodiment.

(ii) In the condition B 03, a task name 21141 in the task configuration 2114 after update (condition B 03) according to the second embodiment indicates the name of the task of a function to be executed. For example, the travel plan task executes the travel plan unit 1101, the judgement function task executes the judgement function unit 1102, the second surrounding recognition task executes the second surrounding recognition unit 1106, and the mode change task executes the mode change unit 1108.

A task ID 21142 indicates an ID by which the task can be identified. An execution cycle 21143 indicates a cycle in which the task is started. The unit is millisecond. Task priority 21144 indicates the priority of the task.

A normal execution time 21145 indicates the execution time of the normal task after the end of initialization. An initialization execution time 21146 indicates the execution time of the initialization process. In the second embodiment, the normal execution time and the initialization execution time are assumed to be set as a maximum execution time, but the present disclosure is not limited to this. For example, the normal execution time and the initialization execution time may be the maximum execution time to which a margin is added. However, the present disclosure is not limited to this.

A function group 21147 indicates a function group to which the task belongs. Scheduling 21148 indicates a scheduling policy under which the task is executed.

<Slot Design>

FIG. 26 is a view illustrating an example of a slot design according to the second embodiment. The configuration items are the same as those in the first embodiment. The slot design corresponding to each condition will be described below.

(i) In the condition A 01, a slot ID 21151 of a slot design table 2115 indicates an ID by which the slot can be identified. A start time 21152 indicates the start time of the time determined as a slot. An end time 21153 indicates the end time of the time determined as a slot. An execution target 21154 indicates a function group permitted to be executed in the corresponding slot.

(i) In the condition A to B 02, a slot ID 21161 of a slot design table 2116 indicates an ID by which the slot can be identified. A start time 21162 indicates the start time of the time determined as a slot. An end time 21163 indicates the end time of the time determined as a slot. An execution target 21164 indicates a function group permitted to be executed in the corresponding slot.

(iii) In the condition B 03, a slot ID 21171 of a slot design table 2117 indicates an ID by which the slot can be identified. A start time 21172 indicates the start time of the time determined as a slot. An end time 21173 indicates the end time of the time determined as a slot. An execution target 21174 indicates a function group permitted to be executed in the corresponding slot. The second embodiment is different from the first embodiment in that the function group for the condition B is not executed in the condition A to B 02.

<Task Scheduling>

Figure 27:
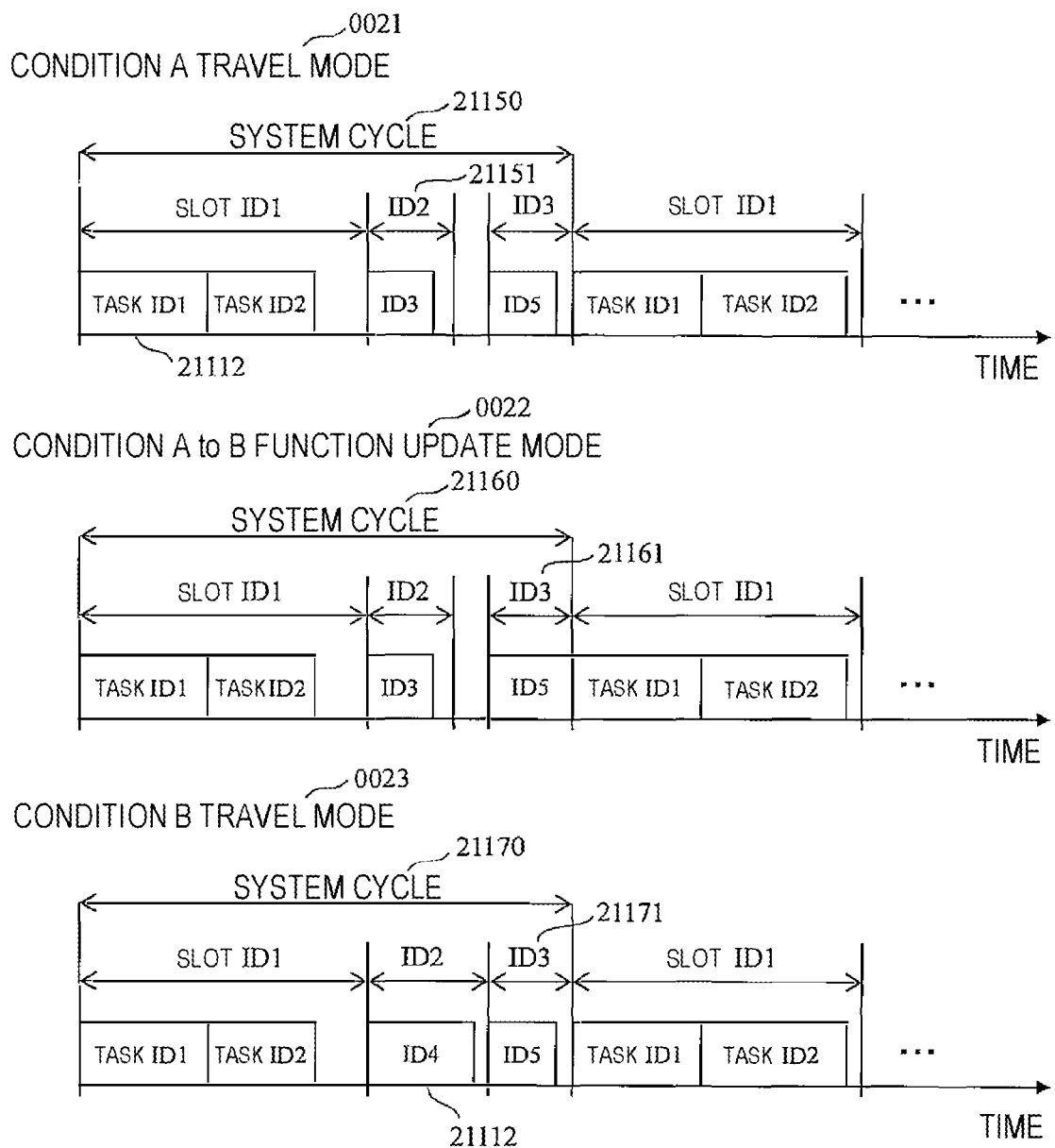
FIG. 27 is a diagram illustrating an example of task scheduling according to the second embodiment.

FIG. 27 is a diagram illustrating an example of task scheduling according to the second embodiment. The task scheduling corresponding to each condition will be described below.

(i) In the condition A travel mode 0021, the tasks of ID=1 and 2 are executed in the slot of ID=1. In the slot of ID=2, the task of ID=3 is executed. Furthermore, in the slot of ID=3, the task of ID=5 is executed. A system cycle 21150 is set to 50 ms.

(ii) In the condition A to B function update mode 0022, the tasks of ID=1 and 2 are executed in the slot of ID=1. In the slot of ID=2, the task of ID=3 is executed. Furthermore, in the slot of ID=3, the task of ID=5 is executed. Also in this case, the system cycle 21160 is set to 50 ms.

(iii) In the condition B travel mode 0023, the tasks of ID=1 and 2 are executed in the slot of ID=1. In the slot of ID=2, the task of ID=4 is executed. Also in this case, the system cycle 21170 is set to 50 ms.

<Summary of Second Embodiment>

According to the second embodiment, different function groups can be operated at the time of the same slot in different conditions, and accordingly hardware resources can be saved. When the time of the initialization process is short, the function update can be performed with the deadline being enabled, and complicated design can be avoided.

(3) Variation

According to the first and second embodiments, the time division scheduling is used in order to realize a time partition in a single core, but the present disclosure is not limited to this. For example, time partitioning may be realized by executing a function group to be continued and a function group to be updated on different cores in a multi-core system. In this case, memory protection is required as in the first and second embodiments, and the mode change unit 1108 is executed in the same core as that of the function group to be continued, thereby updating the function group of the other core.

(4) Summary (i) According to the present embodiment, the control controller (ECU-A) of the vehicle control system manages and executes a plurality of functions in units of predetermined function group. The control controller (ECU-A) is configured to dynamically change (partition update unit) the function group unit, receive a function group change implementation request for instructing change of a function group in response to change of an operation environment of a system from an outside (another ECU (ECU-B) or a server not illustrated) of the control controller, and permit (mode change unit) the execution of the function group whose partition has been updated (changed) in response to the function group change implementation request. Due to this, the function of the system can be changed in response to a command from an external ECU or a server that has detected a condition change, and the availability and safety of the system can be secured.

Before receiving the function group change implementation request, the control controller (mode change unit of the ECU-A) receives a function group change preparation request for requesting preparation for change of the function group from the outside (another ECU (ECU-B), or an overall control device or a server in a vehicle control system not illustrated), acquires change information describing matters to be changed from the outside (another ECU (ECU-B), or an overall control device or a server in a vehicle control system not illustrated) in response to the function group change preparation request, and executes change of the partition of the function group on the basis of the change information (resetting partitioning of the functional group). In this way, change of the configuration of the function group is started in a state where a condition change is occurring, instead of changing the configuration of the function group after the condition has changed, and hence at the stage where the condition actually changes, it is possible to immediately transition to the function of the system corresponding to the changed condition.

(ii) In the present embodiment, the ECU-A executes partitioning of a plurality of functions on the basis of space separation and time separation. Specifically, the ECU-A is configured to separate a memory space to be used for the function group unit as the space separation and separate a time to be executed for the function group unit as the time separation. By executing partitioning by the space separation and the time separation in this manner, it is possible to increase the degree of freedom of slot design, and it becomes possible to effectively utilize hardware resources.

Furthermore, specifically, the function group includes at least a common function group, which is a function to be commonly executed in a plurality of conditions, and an individual function group, whose function to be executed is different depending on a condition. Then, in the space separation, a memory address space of the common function group and a memory address space of the individual function group are distinguished, and a memory area between the common function group and the individual function group is configured via a shared memory space. The common function group is a function to execute a process that guarantees the safety of a vehicle control system, and the individual function group is a function to execute a process that improves the availability of the vehicle control system.

Regarding realization of the time separation, the processor configuration in the control controller can be single-core or multi-core. In the former case, time partitioning is realized by time division scheduling. In this case, the control controller allocates (time division control unit) a slot (time slot for executing a task corresponding to each function) to each function group. On the other hand, in the latter case, the common function group and the individual function group are executed by different core processors to realize the time separation.

(iii) When partitioned by the time separation, the control controller (ECU-A) continuously executes the process of a task included in the common function group other than the update target while updating a task included in the individual function group that is the update target. By doing this, it becomes possible to realize a system update (change) accompanying a condition change without affecting the operation of other programs.

(iv) In the case of time division control, the control controller (ECU-A: mode change unit) updates (partition update unit) the partition in a slot other than the slot allocated to the function group by the time division control, and then starts an update function group. Since the updated function is executed after the slot is surely allocated, the safety of the system can be secured.

(v) In the case of the space separation, the memory space is allocated to the individual function group so as to enable execution, writing, and reading, and the memory space is set to the common function group and the system group so as to enable reading from the memory space allocated to the individual function group. By setting the memory space in this manner, the memory can be protected, and the stability of the system operation can be realized.

It is to be noted that when the allocation of a memory space and the allocation of a slot in the function group unit fail, the control controller (ECU-A) generates an event indicating a dynamic function update error, and outputs the event to the network. Due to this, it becomes possible to monitor whether the partitioning update accompanying the condition change has ended normally.

(vi) When executing the time division control, if deadline determination is enabled for a task included in the function group and the task allocated to the slot has not ended at the time of the end of the slot, the control controller (ECU-A: time division control unit) abnormally stops the unended task, and generates and outputs a deadline miss event. Due to this, even if the task process is not completed, it is possible to judge whether the task process is not completed due to an abnormality or whether the task process is not completed due to a simple delay, and it is possible to appropriately cope with the process delay.

(vii) The present embodiment can also be realized by a program code of software. In this case, a storage medium in which the program code is recorded is provided to the system or the device, and a computer (or CPU or MPU) of the system or the device reads the program code stored in the storage medium. In this case, the program code itself having been read from the storage medium realizes the function of the embodiments described above, and the program code itself and the storage medium storing the program code constitute the present disclosure. As a storage medium for supplying such a program code, for example, a flexible disk, a CD-ROM, a DVD-ROM, a hard disk, an optical disk, a magneto-optical disk, a CD-R, a magnetic tape, a nonvolatile memory card, a ROM, or the like is used.

On the basis of the instruction of the program code, an operating system (OS) operating on the computer may perform some or all of the actual process, and the function of the embodiments described above may be realized by the process. Furthermore, after the program code having been read from the storage medium is written into the memory on the computer, the CPU of the computer or the like may perform some or all of the actual process on the basis of the instruction of the program code, and the function of the embodiments described above may be realized by the process.

Furthermore, by being distributed via the network, the program code of software realizing the function of the embodiments may be stored in a storage means such as a hard disk or a memory of the system or the device or a storage medium such as a CD-RW or a CD-R, and at the time of use, the computer (or CPU or MPU) of the system or the device may read and execute the program code stored in the storage means or the storage medium.

Finally, it should be understood that the processes and techniques described herein are not inherently associated with any specific device and can be implemented by any suitable combination of components. In addition, various types of general-purpose devices can be used in accordance with the instructions described herein. It may be found useful to construct a dedicated device in order to execute the steps of the method described herein. Furthermore, various inventions can be formed by appropriate combinations of a plurality of components disclosed in the embodiments. For example, some components may be removed from all the components presented in the embodiments. Furthermore, components spanning different embodiments may be combined as appropriate. The present disclosure has been described in connection with specific examples, which in all respects are not restrictive but illustrative. Those skilled in the art will appreciate that there are a multitude of combinations of hardware, software, and firmware suitable for carrying out the present disclosure. For example, the software described can be implemented in a wide range of programs or scripting languages such as assembler, C/C++, perl, Shell, PHP, and Java (registered trademark).

Furthermore, in the embodiments described above, the control lines and the information lines that are illustrated are those considered to be necessary for explanation, and not all the control lines and the information lines are necessarily illustrated in the product. All configurations may be interconnected.

In addition, other implementations of the present disclosure will become apparent to those who are ordinarily skilled in the art from consideration of the description and the embodiments of the present disclosure disclosed herein. The various aspects and/or components of the described embodiments can be used alone or in any combination in a computerized storage system having a function to manage data. The description and specific examples are merely exemplary, and the scope and spirit of the present disclosure are set forth in the following claims.

REFERENCE SIGNS LIST 01 condition A
02 condition A to B
03 condition B
11 ECU-A

12 ECU-B
1101 travel plan unit
1102 judgement function unit
1103 common initialization unit
1104 first surrounding recognition unit
1105 condition A unique initialization unit
1106 second surrounding recognition unit
1107 condition B unique initialization unit
1108 mode change unit
1109 partition update unit
1110 time division control unit
1201 screen display unit
1202 update preparation instruction unit
1203 update implementation instruction unit

The invention claimed is:

1. A controller configured to manage and execute a plurality of functions in units of predetermined function group, the controller comprising:
a partition updater configured to change a function grouper; and
a mode changer configured to receive a function group change implementation request for instructing change of a function group in response to a change in an operation environment of a system from an outside of the controller, and, in response to the function group change implementation request, permits execution of the function group changed by the partition updater; and wherein
before receiving the function group change implementation request, the mode changer receives a function group change preparation request for requesting preparation for change of the function group from an outside of the controller, acquires change information describing matters to be changed from an outside of the controller in response to the function group change preparation request, and instructs the partition updater to change partition of the function group, and
the partition updater resets partitioning of the functional group on a basis of the change information.

2. The controller according to claim 1, wherein the partition updater executes partitioning of the plurality of functions on a basis of space separation and time separation.

3. The controller according to claim 2, wherein the partition updater separates a memory space to be used for the function grouper as the space separation and separates a time to be executed for the function grouper as the time separation.

4. The controller according to claim 3, wherein the function group includes at least a common function group, which is a function to be commonly executed in a plurality of conditions, and an individual function group, whose function to be executed is different depending on a condition.

5. The controller according to claim 4, wherein in the space separation, a memory address space of the common function group and a memory address space of the individual function group are distinguished, and a memory area between the common function group and the individual function group is configured via a shared memory space.

6. The controller according to claim 4, wherein the controller includes a single-core processor,
the partition updater realizes time partitioning by time division scheduling as the time separation, and
the controller further includes a time division controller that allocates a slot to each of the function groups.

7. The controller according to claim 4, wherein the controller includes a multi-core processor, and the common function group and the individual function group are executed by different core processors.

8. The controller according to claim 4, wherein a processor included in the controller continuously executes a process of a task included in the common function group other than an update target while updating a task included in the individual function group that is an update target.

9. The controller according to claim 6, wherein the mode changer instructs the partition updater to change partition in a slot other than a slot allocated to the function group by the time division controller, and after the partition updater updates partition, the mode changer starts an update function group.

10. The controller according to claim 4, wherein the partition updater allocates the memory space to the individual function group so as to enable execution, writing, and reading, and sets the memory space at least to the common function group so as to enable reading from the memory space allocated to the individual function group.

11. The controller according to claim 2, wherein when allocation of a memory space and allocation of a slot in the function grouper fail, the partition updater generates and outputs an event indicating a dynamic function update error.

12. The according to claim 6, wherein if deadline determination is enabled for a task included in the function group and the task allocated to the slot has not ended at a time of an end of the slot, the time division controller abnormally stops the unended task, and generates and outputs a deadline miss event.

13. The controller according to claim 6, wherein the individual function group includes an initialization processor that executes an initialization process of a task included in the individual function group, and
the initialization processor disables deadline determination of the task when executing the initialization process, and enables the deadline determination after completing an initialization process of the task.

14. The controller according to claim 4, wherein the common function group is a function to execute a process that guarantees safety of a vehicle controller, and
the individual function group is a function to execute a process that improves availability of the vehicle controller.

15. A vehicle controller that manages and executes a plurality of functions in units of predetermined function group, the controller comprising:
a partition updater that dynamically changes a function group; and
a mode changer that receives a function group change implementation request for instructing change of a function group in response to a change in an operation environment of a system from an outside of the controller, and, in response to the function group change implementation request, permits execution of the function group changed by the partition updater;
a first vehicle controller; and
a second vehicle controller, wherein
the first vehicle controller is the controller according to claim 1, and the second vehicle controller issues the function group change implementation request and transmits the function group change implementation request to the first vehicle controller; and wherein before issuing the function group change implementation request, the second vehicle controller issues a function group change preparation request for requesting preparation for change of the function group and transmits the function group change preparation request to the first vehicle controller, the mode changer of the first vehicle controller receives the function group change preparation request from the second vehicle controller, acquires change information describing matters to be changed from an outside of the controller in response to the function group change preparation request, and instructs the partition updater to change partition of the function group, and the partition updater of the first controller resets partitioning of the function group on a basis of the change information.

16. The vehicle controller according to claim 15, wherein the partition updater executes partitioning of the plurality of functions on a basis of space separation and time separation.

17. The vehicle controller according to claim 16, wherein while executing a process of a first function, the first vehicle controller updates a second function different from the first function.

18. The vehicle controller according to claim 17, wherein the function group includes at least a common function group, which is a function to be commonly executed in a plurality of conditions, and an individual function group, whose function to be executed is different depending on a condition, and while executing a process of a first function group corresponding to a first condition, the first vehicle controller updates a process of a second function group corresponding to a second condition different from the first condition.

* * * * *